United States Patent
Alattar et al.

(10) Patent No.: US 11,568,165 B1
(45) Date of Patent: Jan. 31, 2023

(54) METHODS AND ARRANGEMENTS FOR OPTICAL CODE CLASSIFICATION

(71) Applicant: Digimarc Corporation, Beaverton, OR (US)

(72) Inventors: Adnan M. Alattar, Tigard, OR (US); Vojtech Holub, Lafayette, CO (US)

(73) Assignee: Digimarc Corporation, Beaverton, OR (US)

( * ) Notice: Subject to any disclaimer, the term of this patent is extended or adjusted under 35 U.S.C. 154(b) by 272 days.

(21) Appl. No.: 16/849,288

(22) Filed: Apr. 15, 2020

Related U.S. Application Data

(60) Provisional application No. 62/893,011, filed on Aug. 28, 2019, provisional application No. 62/834,260, filed on Apr. 15, 2019.

(51) Int. Cl.
G06K 7/14 (2006.01)
G06T 1/00 (2006.01)

(52) U.S. Cl.
CPC ......... G06K 7/1447 (2013.01); G06K 7/1417 (2013.01); G06K 7/1434 (2013.01); G06T 1/0021 (2013.01); G06T 1/0092 (2013.01); G06T 2201/005 (2013.01)

(58) Field of Classification Search
None
See application file for complete search history.

(56) References Cited

U.S. PATENT DOCUMENTS

| | | | |
|---|---|---|---|
| 7,020,304 B2 | 3/2006 | Alattar | |
| 9,959,587 B2 | 5/2018 | Sharma | |
| 10,242,434 B1 | 3/2019 | Holub | |
| 2002/0114491 A1 | 8/2002 | Sharma | |
| 2004/0181671 A1 | 9/2004 | Brundage | |
| 2016/0132986 A1 | 5/2016 | Sharma | |
| 2017/0024840 A1 | 1/2017 | Holub | |
| 2018/0005343 A1 | 1/2018 | Rhoads | |
| 2018/0047127 A1* | 2/2018 | Falkenstern | .......... G06T 1/0021 |
| 2019/0139176 A1 | 5/2019 | Stach | |
| 2019/0171856 A1 | 6/2019 | Sharma | |
| 2019/0266749 A1 | 8/2019 | Rhoads | |
| 2019/0332840 A1 | 10/2019 | Sharma | |

FOREIGN PATENT DOCUMENTS

WO 2019165364 8/2019

* cited by examiner

*Primary Examiner* — Lennin R Rodriguezgonzalez
(74) *Attorney, Agent, or Firm* — Digimarc Corporation

(57) ABSTRACT

An optical code reader classifies a code depicted in input imagery, so that appropriate decoding actions can be invoked. This classification may identify, e.g., (a) whether the code is of a continuous tone or sparse mark variety, (b) which one of different reference signals it includes, and (c) which one of different protocols is used in expressing reference and payload signal components of the code. A great variety of other features and technologies are detailed as well.

15 Claims, 15 Drawing Sheets

METHODS AND ARRANGEMENTS FOR OPTICAL CODE CLASSIFICATION

RELATED APPLICATION DATA

This application claims priority to provisional applications 62/893,011, filed Aug. 28, 2019, and 62/834,260, filed Apr. 15, 2019, the disclosures of which are incorporated herein by reference.

TECHNICAL FIELD

The present technology concerns 2D optical codes, and more particularly relates to rapid identification of various different codes so that corresponding code-reading processes can be invoked.

BACKGROUND AND INTRODUCTION

As digital watermarks become more popular, their forms and formats become more diverse. An exemplary point of sale (POS) scanner in a retail store may encounter several different watermark types on product packaging, e.g., continuous-tone watermarks and sparse watermarks. Each may be printed at different resolutions, e.g., 75 watermark elements per inch (WPI) or 150 WPI. Each may include a different form of reference signal. And even for a particular type of watermark (e.g., a sparse, 150 WPI, watermark), different protocols may be in use to accommodate different application requirements. Each combination poses different detection requirements.

Attempting to exhaustively process incoming imagery to decode all possible varieties of watermarks is impractical. For example, point of sale scanners commonly have modest processors that are taxed nearly to their limits simply in decoding 1D barcodes from each frame of incoming imagery, at 60 frames per second. Watermark decoding is typically an afterthought, and allotted only a few milliseconds of the 16-millisecond budget to process each captured frame.

Certain aspects of the present technology help address this problem.

One exemplary embodiment allows a watermark detector to determine the affine presentation of (a) watermarks that use a first form of reference signal, and (b) watermarks that use a second form of reference signal, in only slightly more time than it would take to perform one operation alone. In the process, a synchronization process identifies which form of reference signal is used, which allows subsequent operations to be tailored accordingly.

Another exemplary embodiment identifies which of several different encoding protocols is employed in a watermark, by analysis of accumulated dot contribution data.

Other features and advantages will be more readily apparent from the following detailed description, which proceeds with reference to the accompanying drawings

DETAILED DESCRIPTION

Review of Exemplary Watermarking Methods

Figure 1:
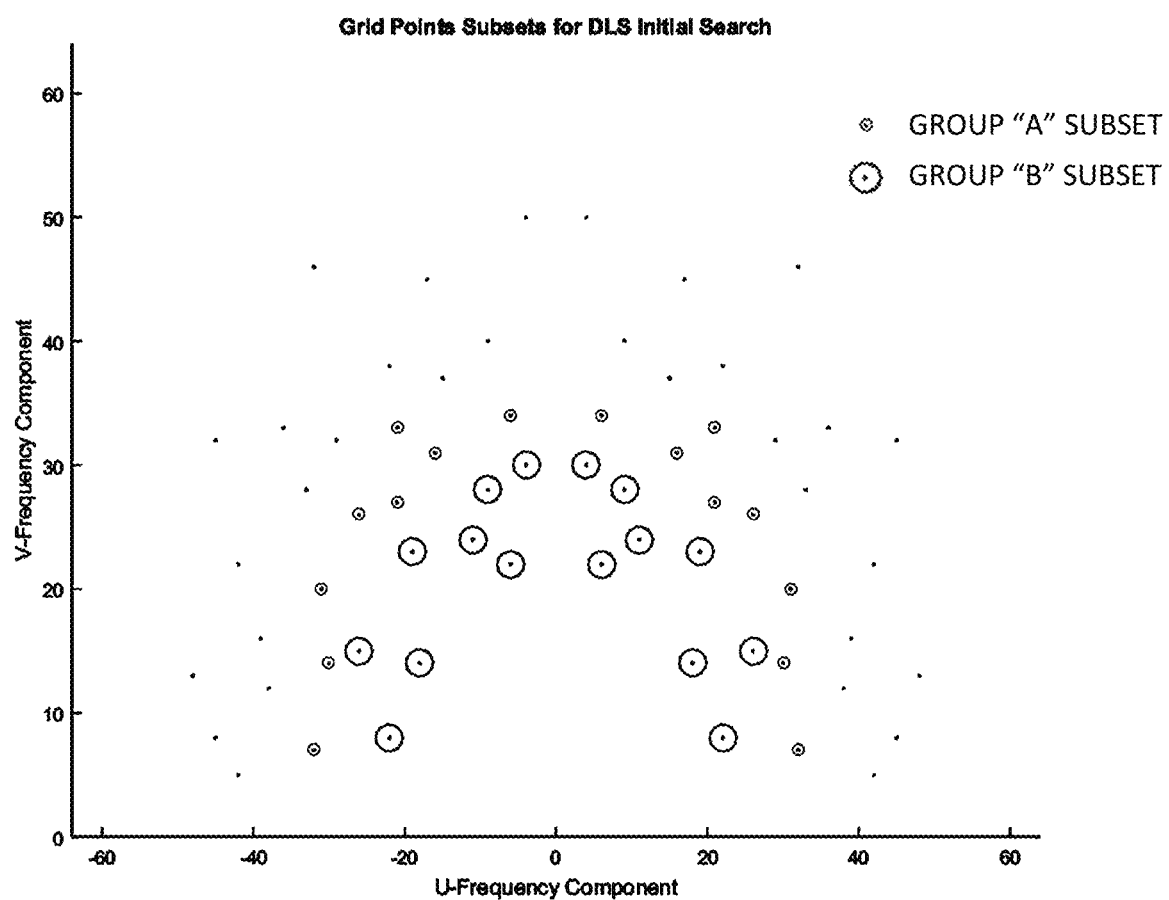
FIG. 1 depicts 64 peaks employed in an illustrative reference signal, together with subsets "A" and "B" thereof.

Digital watermarks, such as the Digimarc Barcode product, are increasing in popularity, and are beginning to displace other forms of optical codes in certain applications.

In an exemplary digital watermarking method, a plural-symbol message payload (e.g., 47 binary bits, which may represent a product's Global Trade Identification Number, or GTIN, together with 24 associated CRC bits) is applied to an error correction coder. This coder transforms the symbols of the message payload into a much longer array of encoded message elements (e.g., binary or M-ary elements) using an error correction method. (Suitable coding methods include block codes, BCH, Reed Solomon, convolutional codes, turbo codes, etc.) The coder output may comprise hundreds or thousands of binary bits, e.g., 1024, which may be termed "raw bits." These bits may be scrambled by XORing with a scrambling key of the same length.

Each of these scrambled raw bits modulates a pseudorandom noise (carrier) sequence of length 16, e.g., by XORing. Each scrambled raw bit thus yields a 16-bit modulated carrier sequence (16 "chips"), for an enlarged scrambled payload sequence of 16,384 elements. This sequence is mapped to elements of a square block having 128×128 embedding locations in accordance with data in a scatter table, yielding a 2D payload signature pattern. Each of these locations is thereby associated with either a value of 0 and 1 (or −1 and +1, or black and white)—with about half of the locations having each state. This bimodal signal is sometimes mapped to a larger bimodal signal centered at an eight-bit greyscale value of 128, e.g., with values of 95 and 161. Each of these embedding locations may correspond to a small region of pixels, such as a 2×2 patch, termed a "bump," which yields a watermark message block having dimensions of 256×256 pixels.

A synchronization component is commonly included in a digital watermark, to help discern parameters of any affine transform to which the watermark has been subjected prior to decoding, so that the payload can be correctly decoded. A particular synchronization component takes the form of a reference signal comprised of a dozen or more magnitude peaks of sinusoids of pseudorandom phase, in the Fourier domain. This signal is transformed to the spatial domain in a 256×256 block size (e.g., by an inverse Fast Fourier transform), corresponding to the 256×256 block to which the enlarged scrambled payload sequence is mapped. The spatial domain reference signal, which may be comprised of floating point values between −1 and 1, can be scaled to a range of −40 to 40 and combined with the 256×256 pixel greyscale payload block to yield a watermark signal block, e.g., having values ranging from 55 (i.e., 95−40) to 201 (i.e., 161+40). This signal can then be summed with host imagery, after first scaling-down to render it inconspicuous.

If such a watermark signal block is printed at a spatial resolution of 300 dots per inch (DPI), a printed block of about 0.85 inches square results. (Since the 0.85 inch side dimension corresponds to 128 watermark elements, or "waxels," this works out to 150 waxels per inch.) Such blocks can be tiled edge-to-edge for marking a larger surface.

The just-described watermark signal may be termed a "continuous tone" watermark signal. It is usually characterized by multi-valued data, i.e., not being just on/off (or 1/0, or −1/+1, or black/white, or binary)—thus the "continuous" moniker. Each pixel of the host image (or of a region within the host image) is associated with one corresponding element of the watermark signal. A majority of the pixels in the image (or image region) are changed in value by combination with their corresponding watermark elements. The changes typically are both positive and negative, e.g., changing the local luminance of the imagery up in one location, while changing it down in another. And the changes may be different in degree—some pixel values are changed a relatively smaller amount, while other pixel values are changed a relatively larger amount. Typically, the amplitude of the watermark signal is low enough that its presence within the image escapes notice by casual viewers (i.e., it is steganographic).

In a variant continuous tone watermark, the signal acts not to change the local luminance values of artwork pixels, but rather their colors. Such a watermark is termed a "chrominance" watermark (instead of a "luminance" watermark). An example is detailed, e.g., in U.S. Pat. No. 9,245,308, the disclosure of which is incorporated herein by reference.

"Sparse" or "binary" watermarks are different from continuous tone watermarks. They do not change a majority of pixel values in the host image (or image region). Rather, they have a print density (which may sometimes be set by the user) that typically results in marking between about 5% and 20% of pixel locations in the image (although fewer than 5% may be marked in some embodiments, and up to 50% may be marked in others). Adjustments are usually made in the same direction, e.g., reducing luminance. Sparse elements are typically bitonal, e.g., being either white or black. Although sparse watermarks may be formed on top of other imagery, they are most commonly presented in regions of artwork that are blank, or colored with a uniform tone. In such cases a sparse marking may contrast with its background, rendering the marking visible to casual viewers. Although sparse marks may take the form of a field of seemingly-random dots, they can also take the form of line or other structures, as detailed below. As with continuous tone watermarks, sparse watermarks generally take the form of signal blocks that are tiled across an area of imagery.

A sparse watermark can be produced from a continuous-tone watermark by thresholding. That is, the darkest elements of the summed reference signal/payload signal blocks are copied into an output signal block until a desired density of dots is achieved.

US patent publication 20170024840, which is incorporated by reference, details various other forms of sparse watermarks. In one embodiment, a signal generator starts with two 128×128 inputs. One is a payload signal block, with its locations filled with a binary (0/1, black/white) expanded scrambled payload sequence, as described above. The other is a spatial domain reference signal block, with each location assigned a floating point number between −1 and 1. The darkest (most negative) "x"% of these reference signal locations are identified, and set to black; the others are set to white. Spatially-corresponding elements of the two blocks are ANDed together to find coincidences of black elements between the two blocks. These elements are set to black in an output block; the other elements are left white. By setting "x" higher or lower, the output signal block can be made darker or lighter.

International PCT application No. PCT/US19/19410, filed Feb. 25, 2019, U.S. application Ser. No. 16/002,989, filed Jun. 7, 2018 (published as 20190171856), and U.S. application Ser. No. 16/405,621, filed May 7, 2019 (published as 20190332840), which are incorporated by reference, detail additional sparse encoding embodiments. One embodiment uses a reference signal generated at a relatively higher resolution (e.g., 384×384 pixels), and a payload signature spanning a relatively lower resolution array (e.g., 128×128). The latter signal has just two values (i.e., it is bitonal); the former signal has more values (i.e., it is multi-level, such as binary greyscale or comprised of floating point values). The payload signal is interpolated to the higher resolution of the reference signal, and in such interpolation process the payload signal is converted from bitonal form to multi-level. The two signals are combined at the higher resolution (e.g., by summing in a weighted ratio), and a thresholding operation is applied to the result to identify locations of extreme (e.g., dark) values. These locations are marked to produce a sparse block (e.g., of 384×384). The threshold level establishes the dot density of the resulting sparse mark.

A different embodiment identifies a list of the N darkest samples (i.e., lowest greyscale values) in a block of a reference signal, e.g., by sorting a threshold-identified subset of samples. The darkest of these N locations are always-marked in an output block, to ensure the reference signal is strongly expressed. The others of the N locations are marked, or not, depending on values of message signal chips that are mapped to such locations (e.g., by a scatter table in the encoder). Locations in the sparse block that are not among the N darkest locations are never marked, and they are consequently affirmatively ignored by a corresponding decoder.

In generating a sparse mark, a spacing constraint can be applied to candidate mark locations to prevent clumping. The spacing constraint may take the form of a keep-out zone that is circular, elliptical, or of other (e.g., irregular) shape. The keep-out zone may have two, or more, or less, axes of symmetry (or none). Enforcement of the spacing constraint can employ an associated data structure having one element for each location in the tile. As dark marks are added to the output block, corresponding data is stored in the data structure identifying locations that—due to the spacing constraint—are no longer available for possible marking. This data structure can then be consulted in evaluating subsequent dark samples for inclusion in the output signal.

In some embodiments, the reference signal can be tailored to have a non-random appearance, by varying the relative amplitudes of spatial frequency peaks, so that they are not all of equal amplitude. Such variation of the reference signal has consequent effects on the sparse signal appearance.

A sparse pattern can be rendered in various forms. Most straight-forward is as a seemingly-random pattern of dots. But more artistic renderings are possible, including Voronoi, Delaunay, stipple, traveling salesman and bricks patterns. Such techniques are detailed in international PCT application No. PCT/US18/64516, filed Dec. 7, 2018 (published as WO2019113471), U.S. application Ser. No. 16/435,164, filed Jun. 7, 2019 (published as 20190378235), and U.S. application Ser. No. 16/212,125, filed Dec. 6, 2018 (published as 20190213705), each of which is hereby incorporated herein by reference in its entirety. (Briefly, an illustrative Voronoi pattern is achieved by forming a mesh of triangular regions with their vertices at locations corresponding to a sparse array of dots. The Delaunay pattern is the dual of the Voronoi pattern, in which the regions take the form of polygons of different numbers of sides. The traveling salesman pattern is achieved by defining a traveling salesman path that visits each dot in a sparse array of dots. The bricks pattern is achieved by placing a vertical line segments at dot positions in an array of sparse dots, and forming horizontal lines at intermediate positions, thereby defining rectangular regions.)

Other overt, artistic patterns conveying watermark data are detailed in publication 20190139176, which is incorporated by reference. In one detailed approach, a designer creates a candidate artwork design or selects one from a library of designs. Vector art in the form of lines or small, discrete print structures of desired shape work well in this approach. A payload is input to a signal generator, which generates a raw data signal in the form of two-dimensional tile of data signal elements. The method then edits the artwork at spatial locations according to the data signal elements at those locations. When artwork with desired aesthetic quality and robustness is produced, it is applied to an object, e.g., by laser marking.

Other techniques for generating visible artwork bearing a robust data signal are detailed in publication 20190213705, which are incorporated by reference. In some embodiments, a neural network is applied to imagery including a machine-readable code, to transform its appearance while maintaining its machine readability. One particular method trains a neural network with a style image having various features. The trained network is then applied to an input pattern that encodes a plural-symbol payload. The network adapts features from the style image to express details of the input pattern, to thereby produce an output image in which features from the style image contribute to encoding of the plural-symbol payload. This output image can then be used as a graphical component in product packaging, such as a background, border, or pattern fill. In some embodiments, the input pattern is a watermark pattern, while in others it is a host image that has been previously watermarked.

Other such techniques do not require a neural network. Instead, a watermark signal block is decomposed into sub-blocks. A style image is then analyzed to find sub-blocks having the highest correlation to each of the watermark signal sub-blocks. Sub-blocks from the style image are then mosaiced together to produce an output image that is visually evocative of the style image, but has signal characteristics mimicking the watermark signal block. Such a method is detailed in application Ser. No. 16/833,178, filed Mar. 27, 2020.

In addition to the references cited above, details concerning watermark encoding and reading that can be included in implementations of the present technology are disclosed in applicant's previous patent filings including US patent documents U.S. Pat. Nos. 6,122,403, 6,590,996, 6,614,914, 6,975,744, 9,922,220, 9,959,587, and 10,242,434, and in pending U.S. application Ser. No. 16/141,587, filed Sep. 25, 2018 (published as 20190266749), Ser. No. 16/405,621, filed May 7, 2019 (published as 20190332840), Ser. No. 16/435,292, filed Jun. 7, 2019 (published as 20190306385), and Ser. No. 16/823,135, filed Mar. 18, 2020. These documents are incorporated herein by reference.

Some aspects of the present technology concern dealing with different watermark reference signals that may be encountered by a watermark reader. Other aspects concern dealing with different watermark signal resolutions (e.g., 75 or 150 WPI) that may be encountered by a watermark reader. Still further aspects of the technology concern dealing with different forms of watermarks (e.g., sparse or continuous tone) that may be encountered by a watermark reader. Yet other aspects concern identifying which encoding protocol is used in a particular code.

As is familiar, watermark reading includes two primary stages. One is synchronization. The other is decoding.

As detailed in applicant's earlier-cited patents, a watermark is typically printed at a known size (e.g., 512×512 pixels), with data encoded in perpendicular rows and columns of watermark elements (waxels), which are aligned with edges of the print substrate. However, once the printed watermark is imaged by a camera, its presentation (pose) can widely vary. The captured image may depict the watermark at larger or smaller scales (i.e., more or less pixels), depending on factors such as imaging distance and lens parameters. The image may depict the watermark at a rotated presentation. The image may also depict the watermark in a sheared presentation, with the perpendicular rows and columns of waxels depicted as intersecting at angles different than ninety degrees. And the viewpoint may be such that the rows appear more closely spaced together than the columns, or vice versa. Synchronization is the task of discerning these distortions in the captured imagery, so that the following, decoding, stage can properly extract encoded payload information—taking these distortions into account.

Four parameters suffice to characterize all these listed distortions. The four parameters are commonly presented in a 2×2 transform matrix, e.g.:

$$\begin{bmatrix} a & b \\ d & e \end{bmatrix}$$

Parameter a indicates horizontal scale; parameter e represents vertical scale; and parameters b and d represent shearing, of which rotation is one particular case.

More particularly, the matrix can be decomposed as:

$$\begin{bmatrix} a & b \\ d & e \end{bmatrix} = \begin{bmatrix} 1 & 0 \\ -W & 1 \end{bmatrix} \begin{bmatrix} 1 & X \\ 0 & 1 \end{bmatrix} \begin{bmatrix} 1 & 0 \\ 0 & Y \end{bmatrix} \begin{bmatrix} Z & 0 \\ 0 & 1 \end{bmatrix} \begin{bmatrix} \cos\theta/S & \sin\theta/S \\ -\sin\theta/S & \cos\theta/S \end{bmatrix}$$

where θ is rotation, S is uniform scale, W is horizontal shear, X is vertical shear, Y is horizontal differential scale, and Z is vertical differential scale.

The four matrix parameters are used to map coordinates in an input space (u,v) into a transformed space (u',v') as follows:

$$u' = au + by + c$$
$$v' = du + ey + f$$

where c and f are translation offsets.

Affine distortion of watermark data is determined by discerning affine distortion of known features of the watermark signal. A known reference signal (sometimes termed a grid signal, a calibration signal, a synchronization signal, or a registration signal) is commonly included in the watermark signal for this purpose. In this discussion, we assume the reference signal takes the form of a dozen or more spatial sinusoids, of different frequencies and phases, that span each watermark block, although other forms of reference signals can be used. In the frequency domain (e.g., after transform by an FFT), the illustrative reference signal takes the form of a distinctive constellation of peaks in a spatial frequency (u,v) halfplane. Such a reference signal, comprising a constellation of 64 peaks in the spatial frequency domain, is shown in FIG. 1. A watermark incorporating such a 64 peak reference signal may be termed a type V1 watermark.

The present technology can be used with various types of geometric synchronization methods. One is a "direct least squares" (DLS) synchronization method, as taught in the above-cited patents (e.g., U.S. Pat. Nos. 9,959,587 and 10,242,434).

Classifying Watermark Type

An exemplary DLS procedure starts with a large set of trial affine transform parameters, termed seeds, and applies each, in turn, to the known reference signal. For each candidate seed transform, the process geometrically transforms the reference signal in accordance with the seed parameters, and determines correspondence between the resulting transformed peaks, and peaks found in the input imagery. (The input imagery typically comprises camera-captured imagery that has been non-linearly filtered with an "oct-axis" filter, discussed below, to emphasize local high frequency variations.) Promising seed transforms are adjusted to better map the reference signal peaks to those found in the input imagery. An iterative process follows, with promising seed transforms iterated further and further, and less promising ones discarded, until a transform is finally identified that brings the transformed reference signal peaks into alignment with peaks actually found in the input imagery. This transform characterizes the scale and rotation (and shear, and differential scaling) of the watermark as depicted in the captured imagery.

A further process (based on phases of the reference signal peaks) then follows to establish the translation of the watermark.

With these parameters established, a watermark decoder knows which locations within the input imagery should be examined to extract values of the originally-encoded waxels.

Figure 2A:
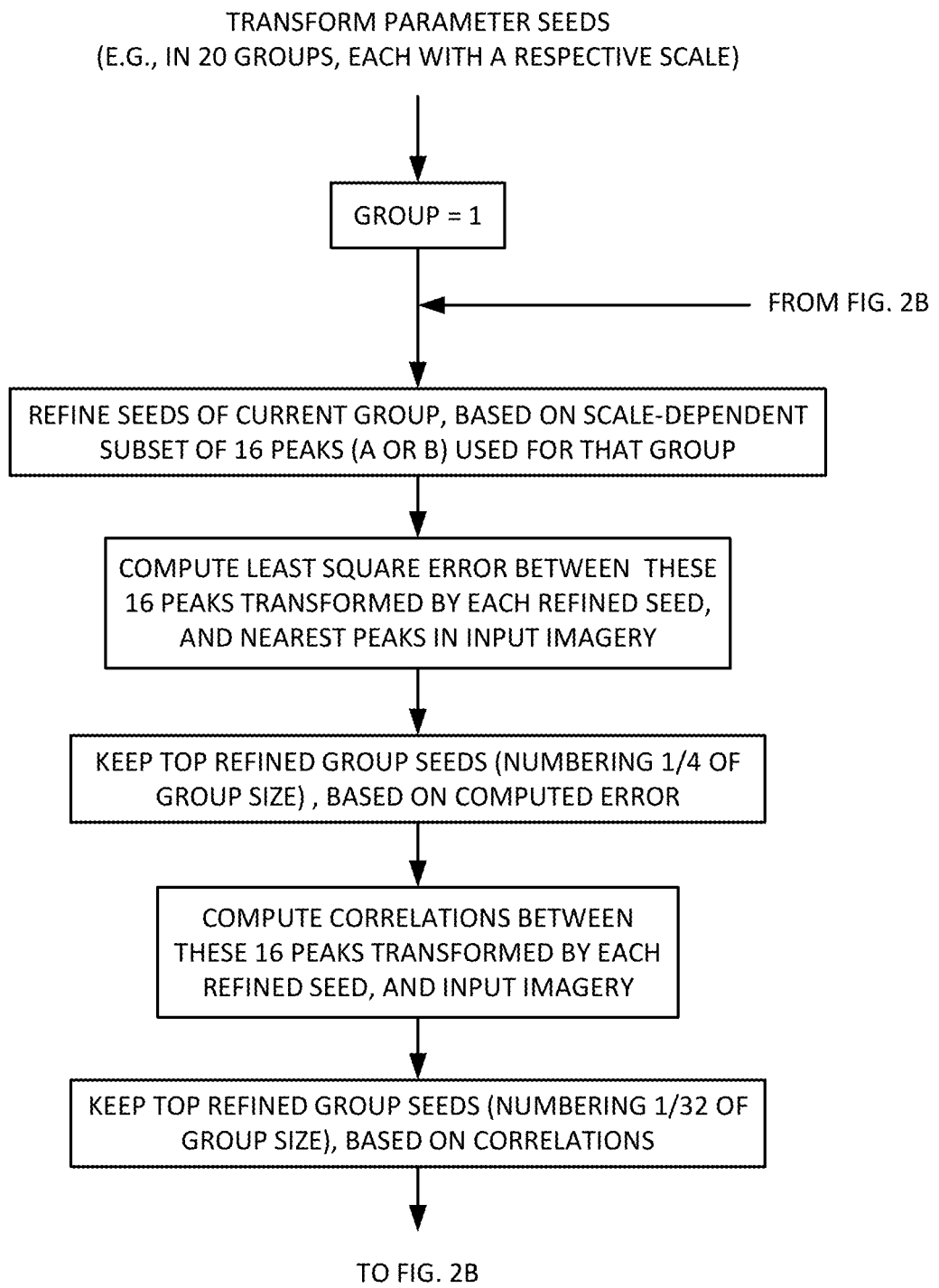
FIGS. 2A and 2B detail an illustrative previous method for determining a 2×2 affine transform matrix, using a direct least squares (DLS) method.
Figure 2B:
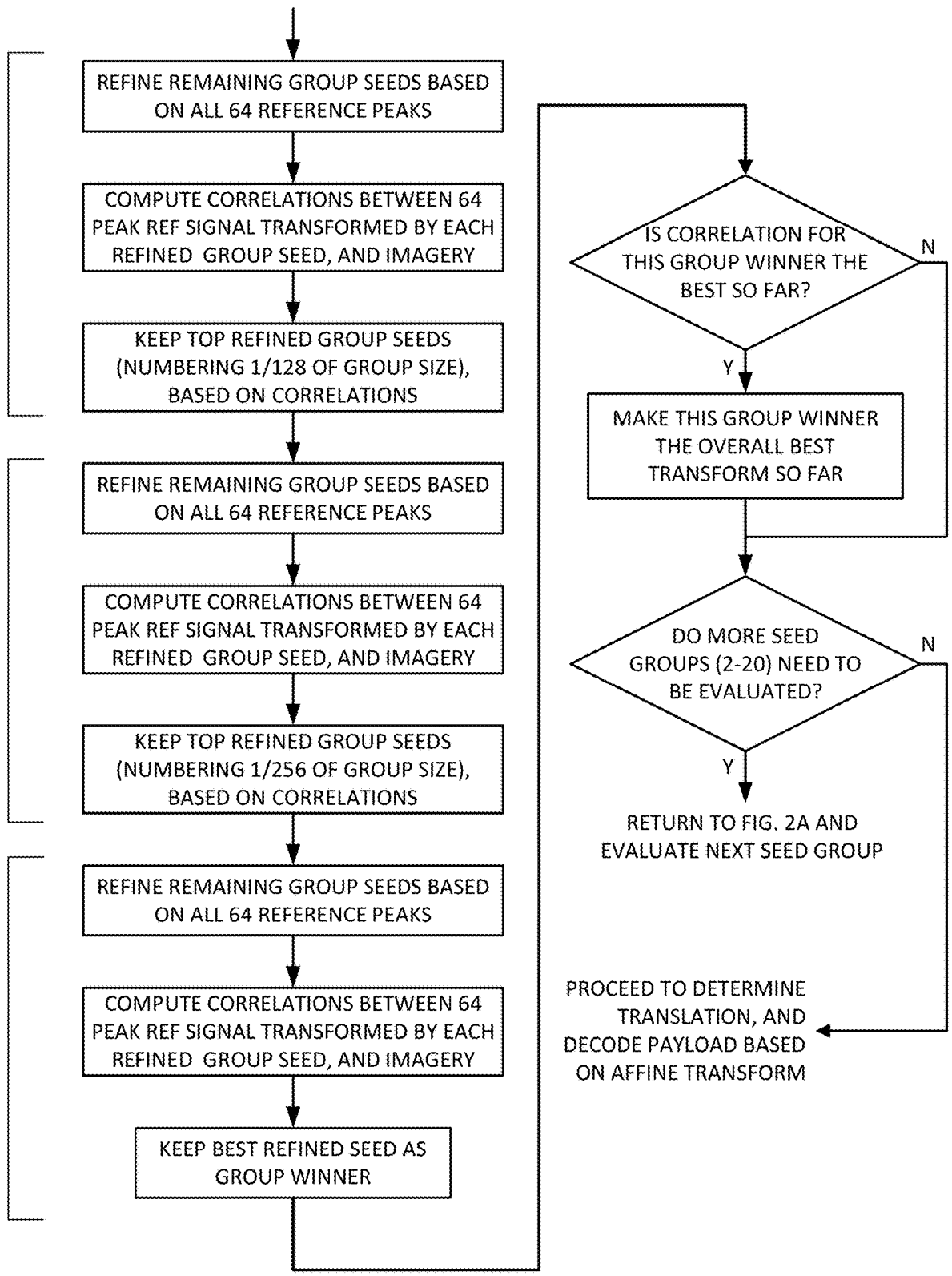

An illustrative DLS process, by which original seed transforms are iteratively refined to determine the affine transform of a 64 peak V1 watermark in input imagery, is detailed in FIGS. 2A and 2B.

In the illustrated process, the transform seeds are organized into 20 groups, based on their scales. A first group of seeds includes transform matrices associated with scale values (i.e., a and e) at or near 0.43. (In this embodiment, all a and e scale values are initially set to be equal, and all b and d values are initially set to be zero.) A second group of seeds includes transform matrices associated with scale values at or near 0.47. A third group includes transform matrices associated with scale values at or near 0.51. And so on, until a twentieth group includes transform matrices associated with scale values at or near 2.2.

There may be thousands of initial seed transform matrices among the 20 groups. To quickly rule-out a majority of these candidates, applicant initially operates on a subset of the peaks in the reference signal, instead of processing data involving all 64 peaks. Different subsets of peaks are used for different scale groups, for this purpose.

For the first and second groups of seeds (i.e., transform matrices associated with small scale values), applicant relies on the subset of peaks shown in FIG. 1 with the small circles—a selection of peaks having mid spatial frequencies. These may be termed peak subset "A." For other groups of seeds (i.e., transform matrices associated with larger scale values), applicant relies on the subset of peaks shown with the large circles—a selection of peaks having low spatial frequencies. These may be termed peak subset "B." Collectively, subsets A and B comprise half of the full set of the 64 peaks used in the type V1 watermark.

Referring to FIG. 2A, the illustrative process starts by considering seeds of the first group, i.e., those associated with scale values at or near 0.43. The transform parameters of each seed are applied to the scale-dependent subset of 16 peaks of the known reference signal peaks (i.e., subset A, for the case of the first seed group), yielding transformed peaks. A neighborhood of spatial frequencies around each transformed peak is examined, in the input imagery, to sense in which direction the corresponding peak within the input imagery lies. (Peaks can be processed in angular order. Affine transformation does not alter sequence of radial angles, so this provides a constraint that aids in establishing correspondence between transformed reference signal peaks and counterpart peaks in the input imagery.) The seed transform is then refined so as to collectively move the 16 transformed reference signal peaks (peak set A in this case) closer to their 16 counterparts in the input image. The distances remaining between these transformed reference signal peaks and the counterparts in the input imagery are then processed to yield a sum-of-squares metric, termed a least square error. Each transformed seed is associated with such a net error metric. Seeds with the highest errors (e.g., 75% of the seeds in the group) are discarded. A figure of merit is then computed based on spatial frequency domain correlation between the transformed 16 peak subset of the reference signal (subset A in this case) and the input imagery. The refined seeds that rank in the top 12.5% by this metric are retained; the others are discarded. At the end of FIG. 2A, only 1/32 of the seeds in the first group remain.

Turning to FIG. 2B, the remaining seed transforms are each refined a second time, so that the locations of the transformed reference signal peaks more closely approximate the locations of the peaks in the input imagery. This time, however, all 64 peaks of the V1 reference signal are considered. A second correlation operation is performed (again based on the complete 64 peak reference signal), and only the seeds in the top quartile are maintained. Overall, only 1/128 of the seeds in the first group now remain.

The just-reviewed actions (shown by a bracket to the left in FIG. 2B) are repeated: the seed transforms are refined a third time, and correlations are again computed. This time, only the seeds in the top half—by correlation score—are maintained. Overall, only 1/256 of the seeds in the first group remain.

The bracketed operations are performed a third time and final time: the seed transforms are refined a further time, and correlations for each are again computed. This time, only the seed transform with the best correlation score is maintained, and it serves as the winner for that group of seeds.

The just-detailed procedure is repeated for each of the 20 groups of seeds—yielding 20 winners, as determined by their respective correlation metrics. From these 20 winners, a final winner is selected, i.e., the quadruply-refined seed yielding the highest correlation with the peaks in the input imagery.

After the best transform matrix is identified, the process goes on to establish the x- and y-spatial offsets of the watermark pattern within the input imagery (parameters c and f in the equations, above), e.g., using the phase estimation and phase deviation techniques detailed in the above-cited patents. Values of waxels depicted within the input imagery are then discerned (e.g., sampled in accordance with the affine transform), and these values are fed to a decoder to extract the watermark payload.

The foregoing describes a synchronization process for a type V1 watermark having a 64 peak reference signal. As noted, however, some other types of watermarks have different numbers of reference signal peaks. An exemplary other watermark has a 16 peak reference signal. Such a watermark may be termed a type V3 watermark, and its 16 peak reference signal may be termed a V3 reference signal.

Figure 3:
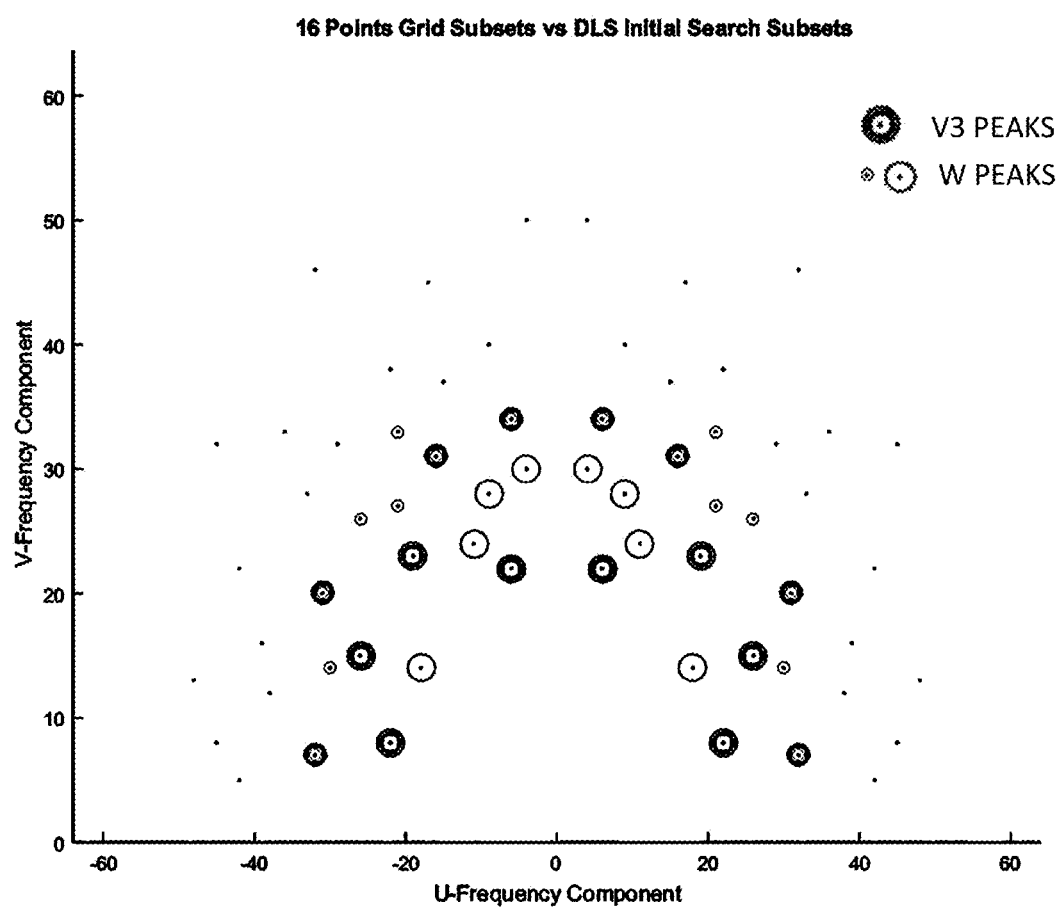
FIG. 3 shows the reference signal of FIG. 1, marked to indicate a set of 16 peaks drawn from subsets A and B to make up a "V3" set, and a complementary set of 16 peaks drawn from subsets A and B to make up a "W" set.

In an illustrative embodiment of the present technology, the 16 peaks of this new, V3 reference signal are a subset of the 64 peaks used with the type V1 reference signal. More particularly, referring back to FIG. 1, 8 of the 16 peaks of the new, V3 reference signal are selected from the mid frequency peaks shown with the smaller circles (peak subset A), and the other 8 peaks are selected from the low frequency peaks shown with the larger circles (peak subset B). Such selection is shown in FIG. 3, with the 16 reference signal peaks used in V3 watermark denoted by the darkest circles.

There are 16 other peaks, which form part of the peak subsets A and B, that are not included among the V3 peaks. These left-out 16 peaks may be termed the W peaks. These are the peaks in FIG. 3 that are circled, but not dark-circled.

As noted, the process of FIGS. 2A/2B— used for type V1 watermarks with 64 peaks in the reference signal—loops through the 20 scale groups (or however many scale groups are actually populated with candidate transform matrices), and for each group performs both an initial search (i.e., FIG. 2A, based on 16 peaks of subset A or B) and multiple further iterations (i.e., FIG. 2B, based on the full set of 64 peaks). In accordance with an aspect of the present technology, a detector searches for both a type V3 watermark (with its 16 peak V3 reference signal) and for a type V1 watermark (with its 64 peak V1 reference signal) by performing the initial search using the 16 V3 peaks, for all 20 scale groups. At the conclusion of this initial search, a classification procedure decides whether the input imagery likely has a watermark with the 16 peak V3 reference signal, or with the 64 peak V1 reference signal (i.e., whether the watermark is type V3 or V1). Subsequent iterations then proceed with either the 16 peak V3 reference signal or the 64 peak V1 reference signal, accordingly.

Figure 4A:
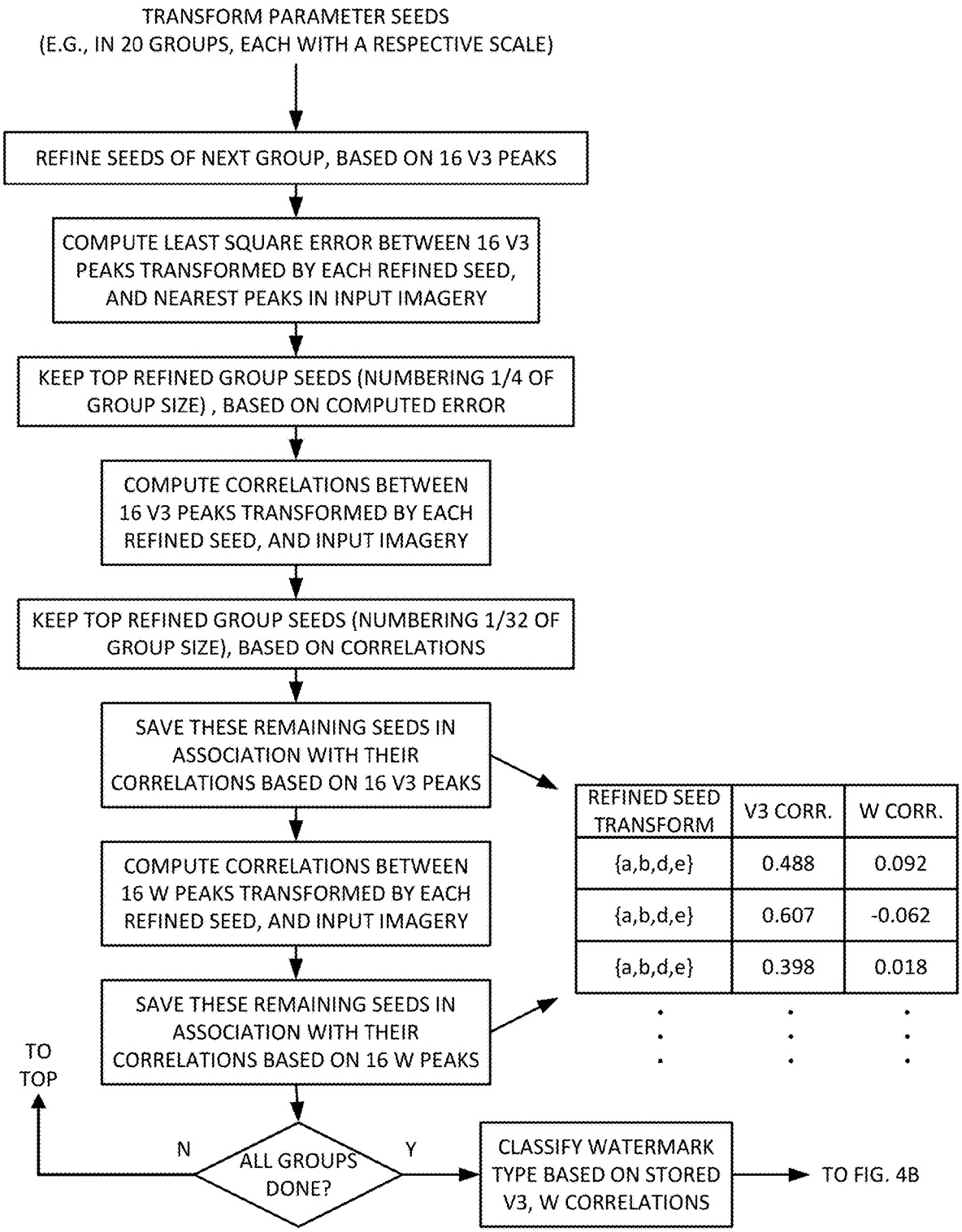
FIGS. 4A and 4B detail one illustrative embodiment employing certain aspects of the present technology.

This classification procedure is illustrated with reference to FIGS. 4A and 4B. The initial acts of FIG. 4A are like those of FIG. 2A, except they are performed with the 16 peaks of the V3 reference signal (without any switching between peak subsets in dependence on seed scale). After the seeds of a group have been once-refined, and the top 1/32 have been identified by the correlation operation, then interim result data is stored in a data structure for later use. In the illustrated embodiment, a table stores the top seed transforms (e.g., four affine parameters a, b, c, d), and associated correlation values (correlating the V3 reference signal as transformed by a refined seed, with the input imagery). Such a table is shown at the lower right of FIG. 4A (with the correlation values stored in the "V3 CORR" column).

The FIG. 4A method then computes a second set of correlation values, this time between the 16 peaks of the W reference signal, as transformed by the refined seeds, and the input imagery. These correlation values are also stored in a data structure for later use (in the column labeled "W CORR").

The just-described process then repeats, successively processing the 2d through $20^{th}$ groups of seeds.

All of the seed transforms stored in the table show substantial correlation with the V3 reference signal. This is because these seed transforms have been refined and winnowed, leaving only 1/32 of their original number. In contrast, the correlation values with the W reference signal may be substantial or not, depending on whether the W signal peaks are found in the input imagery. If the W signal peaks are found in the input imagery, then their correlation values will be substantial too—comparable to the correlation values for the V3 peaks. This indicates that the input imagery contains reference signal peaks in addition to those found in the V3 watermark. Such input imagery must thus contain a V1 watermark, not a V3 watermark. On the other hand, if the W signal peaks have nil correlation with the input imagery (but the V3 peaks do), then the imagery contains a V3 watermark, not a V1 watermark. This is essentially the criterion on which classification is based—identifying whether the input imagery has a type V1 or V3 watermark.

Information in the data structure can be processed in various ways to make a decision. For example, a support vector machine or a neural network can be used. Applicant ran experiments with watermarks of known types to develop a simple a threshold test for discriminating type V1 and V3 watermarks.

Figure 5:
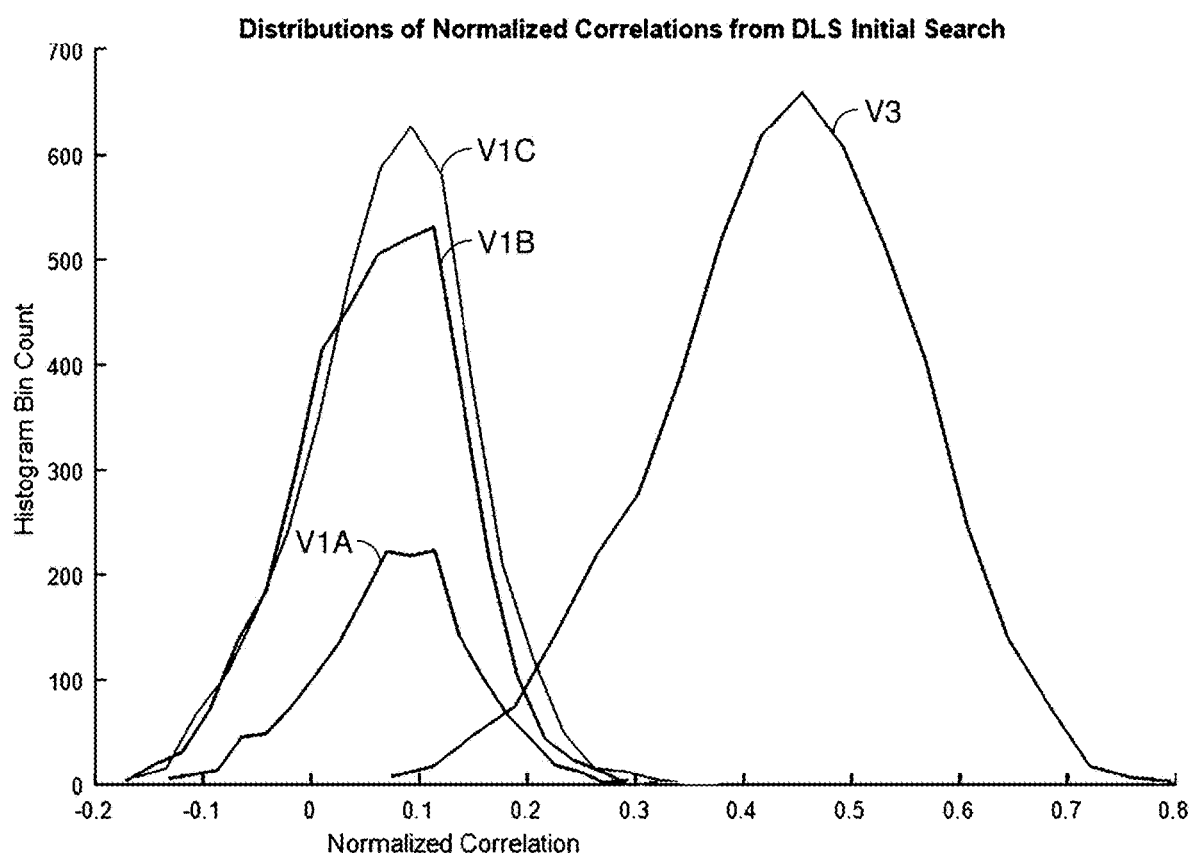
FIG. 5 depicts histograms of correlations associated with the embodiment of FIGS. 4A and 4B.

In particular, for each row of the data structure shown in FIG. 4A, applicant computes a difference between the V3 correlation value and the W correlation value, and divides this difference by the larger of the two values, to yield a normalized correlation value. A large number of experiments were conducted, yielding a histogram detailing occurrence counts for different normalized correlation values, for four different types of watermarks, as shown in FIG. 5. Three of the watermark types use the 64 peak, V1 reference signal (one was a continuous tone watermark, one was a sparse mark employing a first dot selection algorithm, and one was a different sparse mark employing a second dot selection algorithm—these marks being termed marks V1A, V1B and V1C herein). The fourth watermark type uses the 16 peak, V3 reference signal (a sparse mark employing the second dot selection algorithm). The resulting curves are shown in the graph of FIG. 5.

As can be seen, the curves show a clear separation between the V3 watermark (which has an average normalized correlation of 0.441) and the others (which have average normalized correlations of 0.073). In such embodiment, a threshold such as 0.21 can be used to discriminate V3 watermarks. That is, if the average normalized correlation value produced from the FIG. 4A data structure is above 0.21, a watermark in the input imagery is determined to be a V3 watermark (i.e., a mark with a 16 peak reference signal); if the value is below 0.21, it is not a V3 watermark (i.e., it may be a continuous tone or binary mark with a 64-peak reference signal). In the former case, subsequent processing, detailed in FIG. 4B, proceeds based on a full reference signal comprising 16 peaks, i.e., the V3 peaks. In the latter case, the FIG. 4B process proceeds based on a full reference signal comprising 64 peaks, i.e. the V1 peaks.

It will be seen that the FIG. 4A process loops through all 20 seed groups, to conduct initial evaluations. The watermark type is discerned based on correlation data gathered in FIG. 4A. The process then continues to FIG. 4B, which again loops through all 20 seed groups (now much-winnowed) to identify the best overall transform.

Figure 4B:
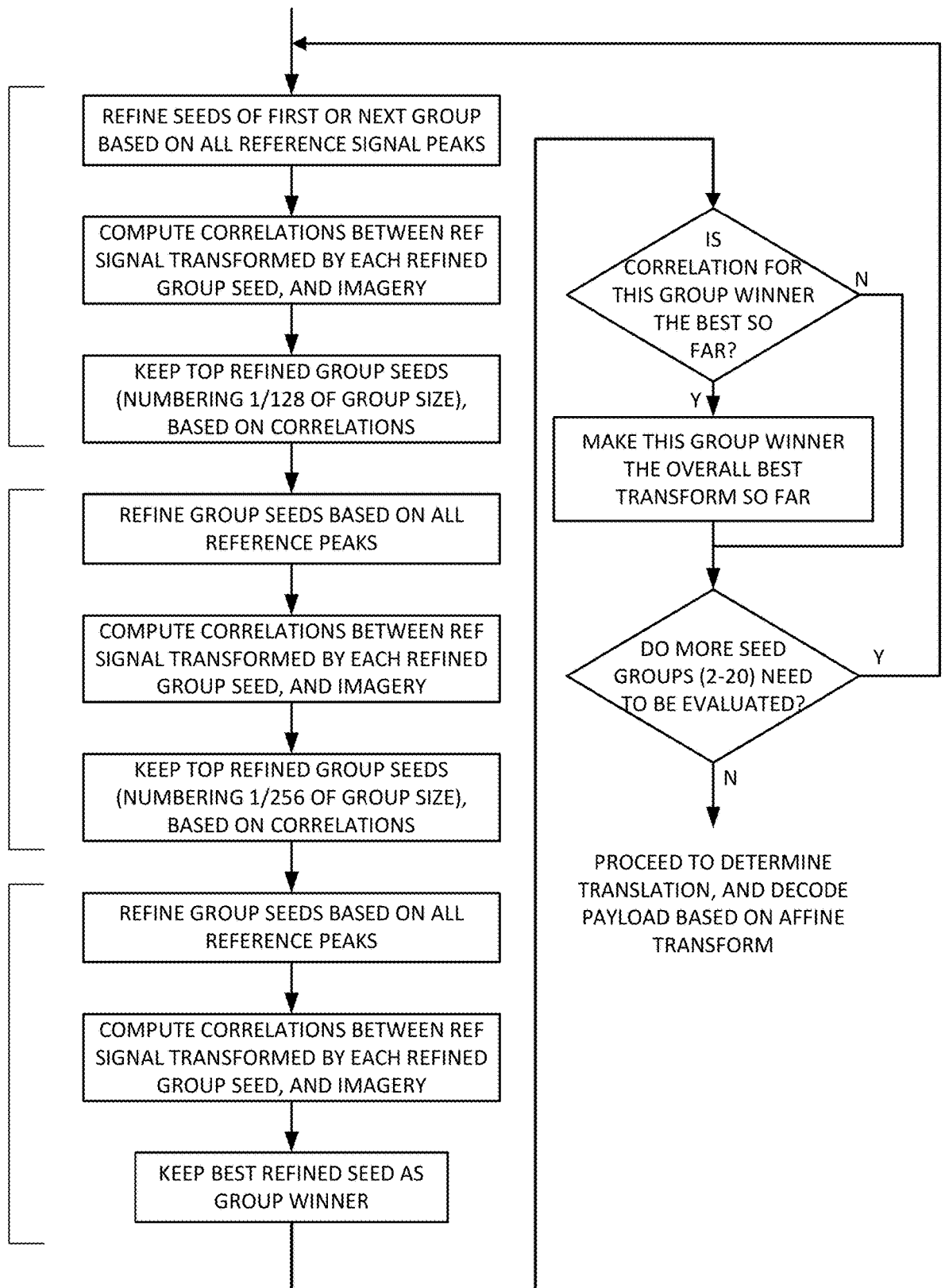

As before, after the best transform matrix is identified in FIG. 4B, the process goes on to establish the x- and y-spatial offsets of the watermark pattern within the input imagery, e.g., using the phase estimation and phase deviation techniques detailed in the above-cited patents. Values of waxels depicted within the input imagery are then discerned (e.g., sampled in accordance with the affine transform), and these values are fed to a decoder to extract the watermark payload.

It will be recognized that the above-described arrangement efficiently produces 2×2 transform parameters characterizing presentation of a watermark pattern in input imagery, for watermarks employing both 16- and 64-peak reference signals. Moreover, it identifies which type of watermark is present (i.e., including a 16-peak or a 64-peak reference signal)—permitting subsequent processing to proceed based on particular parameters or decoding strategies appropriate for that form of watermark. For example, if the V3 watermark is a sparse form of watermark in which certain dot locations signify the reference signal, and other dot locations signify payload information, then it should be processed with a decoder that interprets these dot locations accordingly, and ignores other dot locations (as discussed further below). If the V1 watermark is a sparse form of watermark in which all dot locations signify both reference signal and payload information, then it should be processed with a decoder that proceeds accordingly. Or if the V1 watermark is a continuous-tone form of watermark in which all locations may be marked, in a non-binary fashion, then it should be processed with a decoder that proceeds according to this manner of encoding.

The "cost" of this improvement is a few more correlation operations (performed using the W set of peaks), and a few subtraction and division operations—a significant economy compared to the alternative of analyzing input imagery for a 16 peak reference signal, and also analyzing input imagery for a 64 peak reference signal. Such technology can be deployed in POS scanners to enable reading of newer, V3 watermarks, while maintaining backwards compatibility with older, V1 watermarks.

Other embodiments can naturally proceed differently. For example, classification can still be based on correlation differences using the V3 and W peaks, but same can occur after the first iteration in FIG. 4B, instead of at the end of FIG. 4A. Similarly, one or more of the 20 groups of transform candidates can be disqualified from consideration based on low V3 correlation. For example, if a seed group's best correlation result is below 0.2, then that group of seeds can be disqualified. In such case, no statistic from this group is considered in the data table/classification procedure. While the described arrangement employs correlation operations, it will be understood that other signal similarity measures can likewise be employed.

The W peaks are advantageous in the described arrangement because their spatial frequencies span a range comparable to those of the V3 peaks. For example, the highest frequency of a W peak (i.e., its distance from the origin in FIG. 3) is within 15% of the highest frequency of a V3 peak. (It's actually about 12% higher.) Similarly, the lowest frequency of a W peak is within 15% of the lowest frequency of a V3 peak. (It's actually about 11% higher.)

Naturally, use of multiple groups of initial transform seeds is not essential. This is an expedient associated with use of multi-threaded processing. Where such groupings are used, they need not contain the same number of initial seeds. If a group starts with a small number of seeds, the winnowing may run out of seeds early, i.e., there is only one seed remaining, and no more to be discarded. For example, if a group has only 3 initial transforms, then it is winnowed to a single transform after the least square error assessments of FIG. 4A. This single transform continues to be refined by the three iterations of FIG. 4B, but it was earlier predestined to be the group's winner. (Correlations needed to determine a group winner can be skipped.)

It is not essential for the synchronization process to employ a reference signal distinct from the payload signal, as in the illustrative embodiment. Some payload signals have known, distinctive features that can be used for synchronization purposes, without a distinct reference signal.

Naturally, while the V3 watermark in the detailed embodiment is a sparse watermark, this is not essential. The present arrangements can be employed with watermarks of different forms.

Similarly, while the detailed arrangement employs DLS-based synchronization, this is not essential. For example, impulse matched filter (IMF) techniques can also be used (e.g., correlating with a template comprised of peaks), as detailed in earlier-cited patents U.S. Pat. Nos. 10,242,434 and 6,590,996.

A variant embodiment further illustrates this aspect of the technology. In this variant embodiment, an IMF-based synchronization stage is used.

In an exemplary such embodiment, an IMF-based synchronization stage determines scale and rotation by searching input imagery for the 16 peak V3 reference signal. It then performs a second such registration operation, searching the input imagery for another signal. The other signal can be the 64 peak V1 reference signal, or it can be the 16 peak "W" signal that is different than the V3 signal but similar in frequency content. Metrics from these two operations are then compared.

One suitable metric is a reference pattern strength metric, which is the sum of the magnitudes of the reference signal peaks found in the input imagery, using the determined scale and rotation. Another suitable metric is a linear pattern strength metric. This value is again based on the magnitudes of the reference signal peaks, but further includes dividing each by an average value of its neighbors in Fourier space, and then computing an average across all peaks. (These two metrics are detailed in U.S. Pat. No. 10,506,128.)

Four comparisons are thus particularly contemplated—any of which can be applied to the input imagery:

V1 vs. V3, judged by the pattern strength metric;

W vs. V3, judged by the pattern strength metric;

V1 vs. V3, judged by the linear pattern strength metric; and

W vs. V3, judged by the linear pattern strength metric.

A suitable comparison operator is subtraction, e.g., subtracting the input imagery pattern strength metric based on the V3 peaks from the input imagery pattern strength metric for the V1 peaks.

Applicant ran a large number of experiments for each of these four comparisons, applying input images bearing different types of watermarks (i.e., with the V3 and V1 reference signal), and tallied the various difference values resulting when the input image bears a V3 watermark, and when it bears a V1 watermark. Resulting histograms are shown in FIGS. 6A, 6B, 6C, and 6D.

Figure 6A:
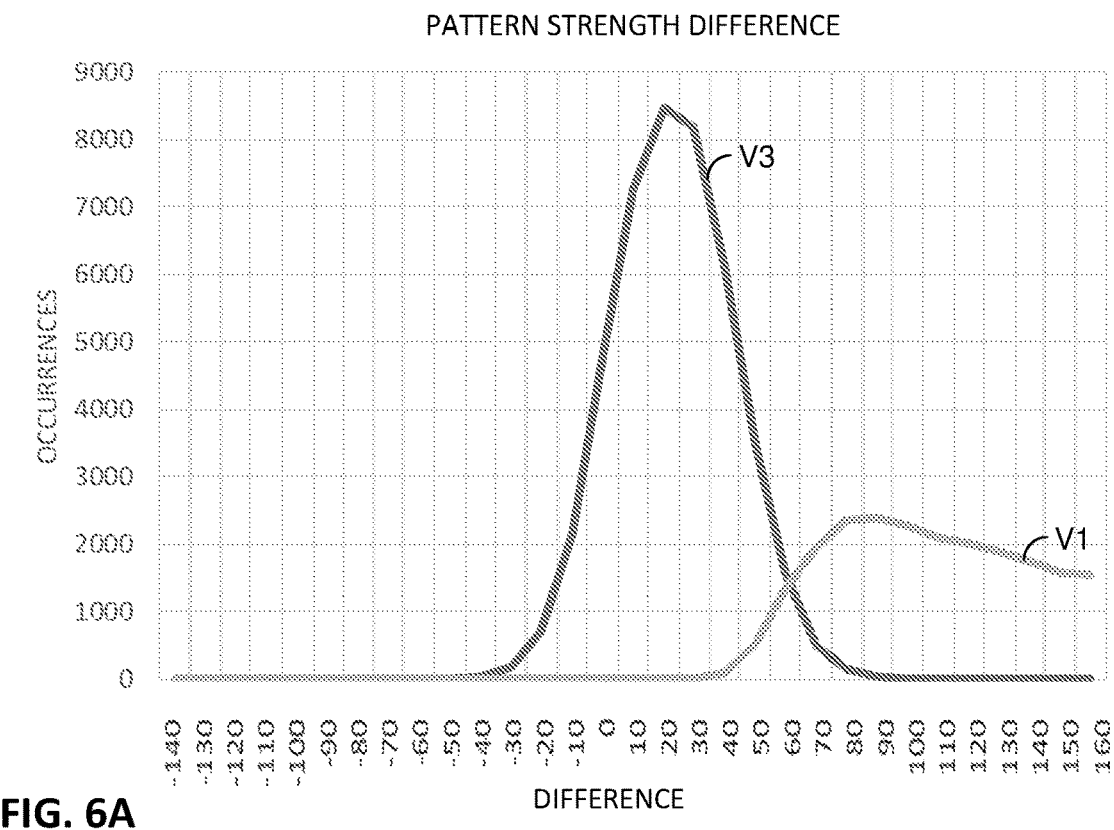
FIGS. 6A, 6B, 6C, and 6D depict histograms of pattern strength differences associated with a different embodiment.
Figure 6B:
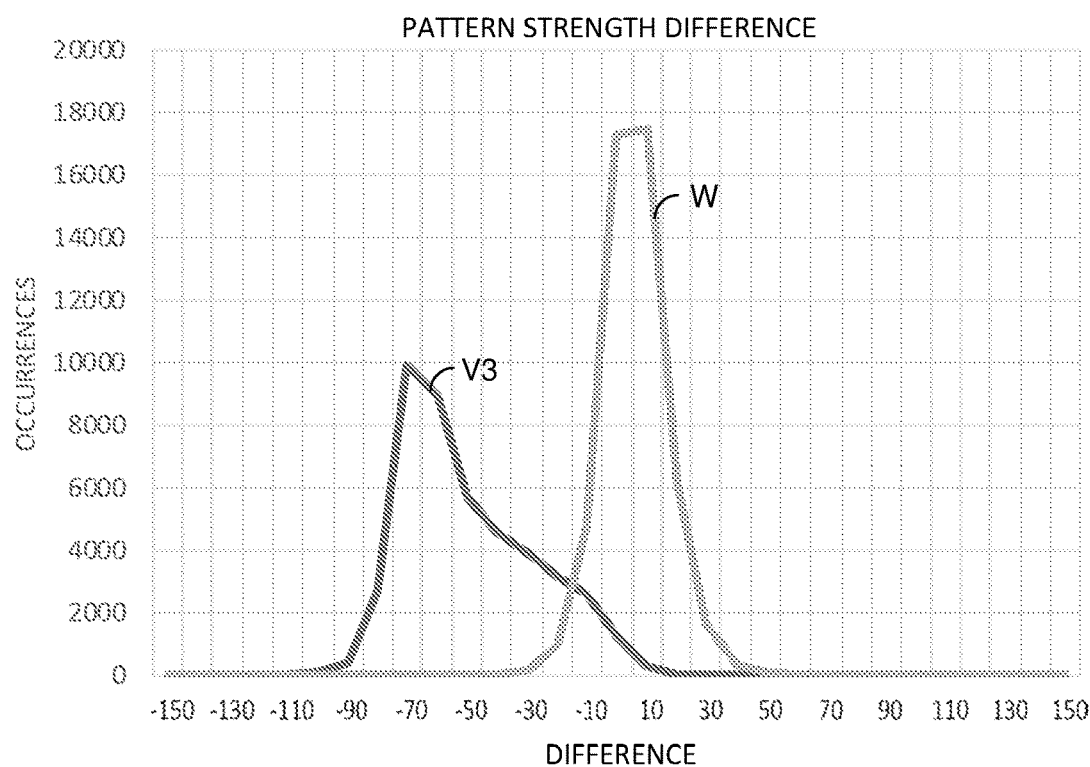
Figure 6C:
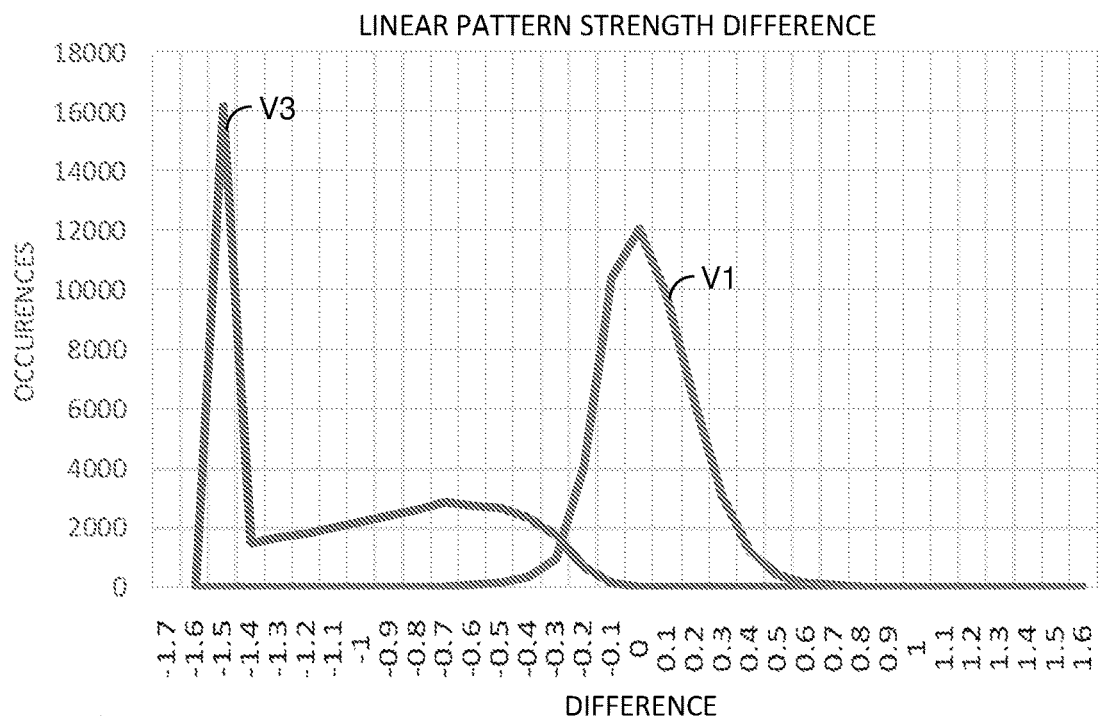
Figure 6D:
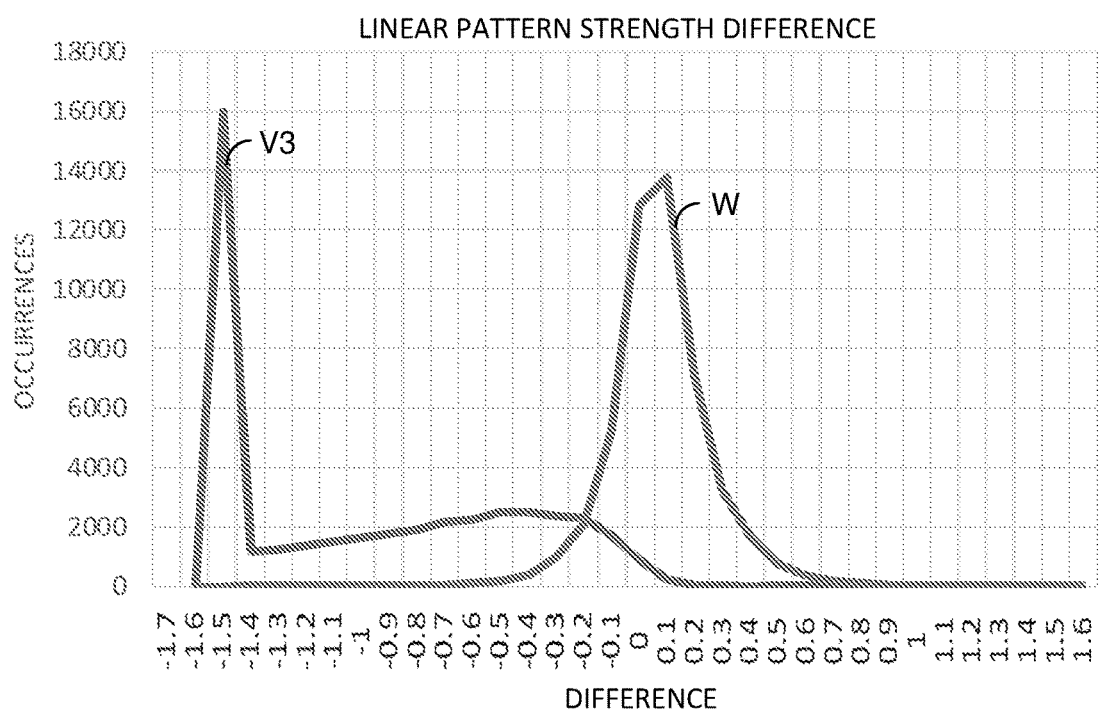

Again, in each of FIGS. 6A, 6B, 6C and 6D, the curves are clearly separable. In FIG. 6A, if subtracting the V3 pattern strength metric from the V1 pattern strength metric yields a value less than 57, then there is a 97% probability that any watermark present in the input imagery is a V3 watermark. Similarly for FIG. 6B, if the difference in pattern strength metrics is less than −14, there is a 93% probability that any watermark present in the input imagery is a V3 watermark. Likewise for FIG. 6C, if subtracting the V3 linear pattern strength metric from the V1 linear pattern strength metric yields a difference value less than −0.325, there is a 97% probability that any watermark present in the input imagery is a V3 watermark. Finally, for FIG. 6D, if the difference in linear pattern strength metrics is less than −0.2, there is a 97% probability that any watermark present in the input imagery is a V3 watermark.

Again, knowing—through the synchronization process—that the watermark is a type V3 watermark, permits subsequent processing to proceed based on particular parameters or decoding strategies appropriate for that form of watermark (e.g., interpreting certain locations in a dot pattern as conveying reference signal information only; interpreting other locations as conveying both reference signal information and payload information; and interpreting still other locations as being unused, always blank, and thus to be ignored).

In some embodiments, discriminating between V1 and V3 watermarks can comprise establishing one or more pose parameters for input imagery based on features of a V3 watermark and generating an associated first figure of merit; establishing one or more pose parameters for the input imagery based on features of a V1 (or W) watermark and generating an associated second figure of merit; and then comparing the two figures of merit to determine if the input imagery includes a V3 or V1 watermark (as in the second, IMF, embodiment just-discussed).

In other embodiments, discrimination can again begin by establishing one or more pose parameters for input imagery based on features of a V3 watermark, and generating an associated first figure of merit. The input imagery can then be examined for features of a V1 watermark—based on the V3-determined pose parameters, and a second figure of merit can be generated (as in the first, DLS, embodiment discussed earlier). Comparison of the two figures of merit then reveals whether the input imagery more likely includes a V3 or V1 watermark.

Different geometric synchronization techniques can be used in tandem. For example, in a first process, the detailed DLS arrangement can be used to obtain one estimate of the 2×2 transform matrix that characterizes the reference signal as found in the input imagery. In a second process, an impulse matched filter arrangement can make its own estimate—after being informed by the first process of whether it should look for a watermark with a V1 reference signal or a V3 reference signal. Each of the two resulting estimates can then be applied to the reference signal, and assessed to determine which estimate is better. (Again, such assessment can be performed based on correlation, reference pattern strength, linear reference pattern strength, etc.) The better transform estimate can then be used in subsequent processing, e.g., in determining translation and extracting the payload.

If the present technology is used in a POS scanner that employs one or more tilted mirrors to reflect imagery onto an image sensor, the fixed image tilt introduced by such mirrors can be reversed, by suitable image counter-distortion, before applying the detailed methods. In DLS-based embodiments, the counter-distortion can alternatively be effected as part of the original seed transform estimates.

Antecedents

Aspects of the foregoing were introduced in provisional application 62/730,958, filed Sep. 13, 2018 (subsequently filed as utility application Ser. No. 16/823,135), and international application PCT/US19/19410 (published as WO2019165364). Those documents consider situations in which a device might encounter both continuous-tone watermarks and sparse watermarks, and need to distinguish between them in order to apply different decoding strategies. A particularly-considered sparse watermark is of a type alluded to earlier: the locations where the reference signal is the darkest (extrema) are always marked in the output block to convey reference signal information; other such dark locations are marked or not to convey payload information—while also serving (when marked) to convey reference signal information; and still other locations are always unused, and thus always to be ignored. The following paragraphs are copied from the just-cited patent documents:

In a preferred implementation, a decoder is multi-functional—able to apply different decoding procedures to different marks. Such a decoder makes an initial determination of the type of encoding used to represent the message signal, and applies a corresponding decoding method.

In one such arrangement, the type of encoding is signaled by the presence or absence of certain spatial frequencies in the reference signal. As noted, this reference signal typically comprises several dozen different spatial frequencies (and phases). A few more spatial frequencies (e.g., 1-10) can be added (or omitted) to serve as a flag, to a compliant detector, indicating that a particular one of the just-detailed encoding procedures is being used, and that a corresponding decoding method should likewise be used. That is, such a detector examines the reference signal to determine whether certain flag spatial frequencies are present (or absent) in the reference signal, and applies a decoding method corresponding to the output of such determination. The presence or absence of such frequencies does not interfere with the reference signal's purpose of enabling synchronization of the decoder to the message signal, since that synchronization process is robust to various distortions of the reference signal.

In another embodiment, the decoder begins by compensating the captured imagery for affine distortion, using the reference signal in the conventional manner. It then examines locations that are used for marking in the embodiments detailed above, and locations that should be blank. The decoder determines which are marked, and which are unmarked. If some threshold number K of marks are found at locations where a particular embodiment should have no mark, then that embodiment is ruled-out. Similarly, if some threshold number M of unmarked regions are found at locations where a particular embodiment should have a mark, then that embodiment is ruled-out. By a process of elimination, the decoder narrows down the possibilities to hopefully one, or in some instances two, particular embodiments that may be in use. It then applies a decoding algorithm for the one embodiment and, if that does not yield valid data (e.g., as indicated by checksum information), it applies a decoding algorithm for the second embodiment (if still a candidate).

One particular implementation identifies tile locations that should not have any marking, by identifying extrema of the reference signal that are light, i.e., of values greater than 128. This can be done by sorting the reference signal samples for the 16,384 tile locations to identify, e.g., the 1024 highest-valued extrema. A like number of lowest-valued (darkest) extrema of the reference signal are conversely determined. If the number of dots in the locations associated with the lowest-valued extrema is J times the number of dots in the locations associated with the highest-valued extrema (where J is, e.g., 2 or 3 or more), then the input signal is apparently a sparse mark, and a decoding procedure specifically corresponding to a sparse mark (e.g., ignoring locations that are predictably unmarked) can be applied. Else, a conventional watermark decoding procedure can be applied.

A related arrangement computes two correlation metrics from the input signal after oct-axis filtering (e.g., producing output values in the range of −8 to 8) and geometric registration. A first metric is based on signal values at the set of, e.g., 1024, locations at which the reference signal has the lowest (darkest) values—termed "sparseLocs." A second metric is based on signals values at the set of, e.g., 1024, locations at which the reference signal has the highest (lightest) values—termed "compLocs."

The first metric, "sparseMet," is computed as follows:

sparseMet=−sum($x$(sparseLocs))/sqrt($x$(sparseLocs)'*$x$(sparseLocs))

The second metric, "compMet," is computed as follows:

compMet=sum($x$(compLocs))/sqrt($x$(compLocs)'*$x$(compLocs))

where x(sparseLocs) is a vector (e.g., a row vector) of the tile values at the 1024 sparseLocs locations; and X(sparseLocs)' is its transpose. Similarly for x(compLocs).

When applied to imagery marked with a continuous tone watermark, both metrics have approximately the same value. When applied to imagery marked with sparse codes, however, the metrics diverge, with sparseMet having a value that is typically 4 to 10 or more times that of compMet.

These metrics can naturally be based on more or less points. In one alternative, sparseMet is based on a set of fixed marks (representing only the reference signal), while compMet is based on a like number of the lightest values in the reference signal tile.

Yet another approach to distinguishing a sparse input signal from a conventional, continuous tone watermark signal is by reference to the spatial frequency composition of the reference signal. The representation of the reference signal by a sparse selection of extrema points somewhat distorts its spatial frequency content. For example, the higher frequency components are higher in amplitude than the lower frequency components, when represented by sparse extrema dots. Extrema that are always marked to reinforce the reference signal contribute stronger signal components, on average, than extrema that may be present or absent depending on message bit values. Etc.

The conventional watermark decoding process involves correlating the Fourier transform of the captured image signal with a template of the reference signal (i.e., a matched filter operation). A decoder can apply two such matched-filtering operations to the transformed image signal: one determining correlation with the traditional, continuous tone reference signal, and the other determining correlation with a distorted counterpart associated with a sparse selection of reference signal extrema (e.g., with certain of the extrema at half-strength, due to bit modulation). If the captured imagery is found to better correspond to the latter signal, then this indicates that a sparse mark is being decoded, and a corresponding decoding process can then be applied—instead of a conventional decoding process.

Still another approach to sensing whether the input signal is sparse or not is to try different input filtering operations. Conventional watermark detectors typically employ an oct-axis filter, as described in various patent publications, including 20180005343. Alternate filtering operations may be more suitable for sparse codes, such as a 5×5 pixel MinMax filter kernel, or a donut filter. (A MinMax filter produces an output equal to the center element value divided by the difference between the largest and smallest values of the 5×5 element area centered on the center element. A donut filter determines correlation of an, e.g., 5×5 element patch, with a reference pattern consisting of a black element surrounded by white elements.) By running both an oct-axis filter on the input data, and one of the alternate filters, and examining the results, the type of input data may be discerned as either being a conventional watermark or a sparse watermark.

Just as the presence or absence of certain spatial frequencies in the reference signal can be used to signal different encoding schemes, the same approach can additionally, or alternatively, serve to signal different print resolutions. For example, a sparse code printed with a 300 dpi printer may be composed with a reference signal that includes spatial frequencies of 11 and 21 cycles per block. A sparse code printed with a 203 dpi printer may be composed with a reference signal that includes spatial frequencies of 13 and 19 cycles per block. The decoder can discern such frequencies, and convert the captured image to the corresponding resolution prior to extracting the message bits.

Different Scales Among the various forms and formats of watermarks that may be encountered by a POS terminal are watermarks that have a common reference signal, yet are printed at different scales (e.g., 150 WPI and 75 WPI). Each may convey a payload encoded in a 128×128 waxel array. And each may sometimes fall within the detection range of a single watermark detector. (An exemplary watermark detector can read watermarks at scales ranging from 44%-220%, a 5:1 scale range.) However, the range of viewing distances for which both marks fall within the 44%-220% scale range is limited.

For example, at a first viewing distance, a 75 WPI mark may be presented at a 100% scale, and a 150 WPI mark imaged from the same distance may be presented at a 50% scale. But if the viewing distance is increased much more, the 150 WPI mark becomes too small (falling below the 44% limit). In another example, at a second viewing distance, the 75 WPI mark may be presented at a 200% scale, and the 150 WPI mark imaged from the same distance may be presented at a 100% scale. But if the viewing distance is reduced much more, the 75 WPI mark becomes too large (exceeding the 220% limit). The 5:1 scale range is thus effectively cut in half, limiting the capability of the watermark reader.

Detection, in such contexts, can be aided by producing a signal that depicts such first and second watermarks at more consistent scales—despite their different original scales.

Figure 7A:
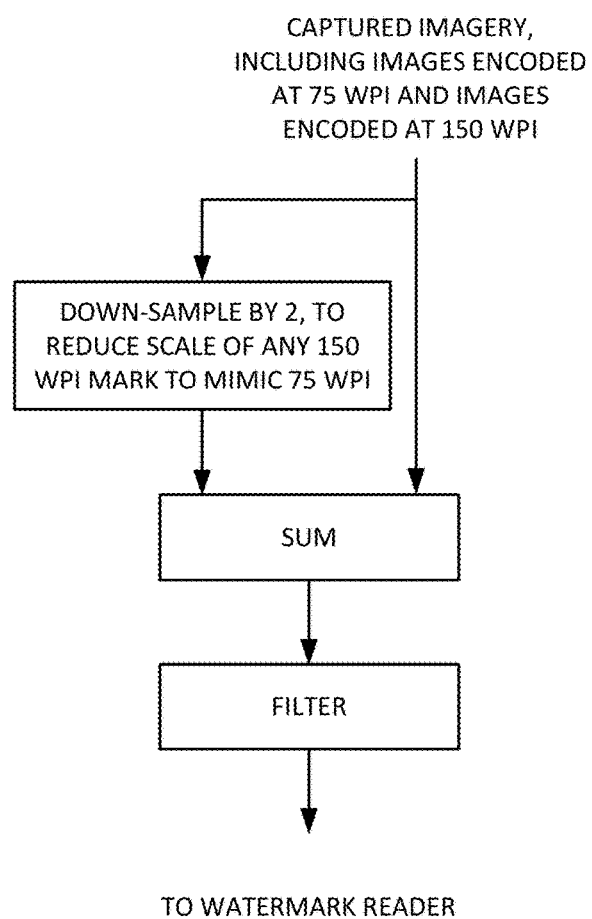
FIGS. 7A and 7B detail exemplary methods including certain aspects of the present technology.

One such arrangement is shown in FIG. 7A. Input imagery is down-sampled by a factor of 2 and summed with the original imagery. The result is provided to a digital watermark detector configured for 75 WPI watermarks (i.e., configured so that such watermarks, at a nominal expected viewing distance, have a scale j of 100%).

If the input imagery actually does depict a 75 WPI watermark, it will be detected as-is in the summed data.

Conversely, if the input imagery depicts a 150 WPI watermark, its down-sampling by two effectively shrinks the data set, mimicking a 75 WPI mark. This down-sampled data will be detected in the summed data.

Down-sampling can be achieved by discarding alternate rows and columns of data, or by box filtering. Alternatively, a Gaussian blur filter can be employed. In all cases, the pixel count is reduced by a factor of four.

Desirably, no data is lost in the summation of the two image signals. If the input pixel values are 8-bit data (representing pixels of value 0-255), then desirably the output sum is represented with at least one additional bit, enabling representation of values 0-511. In embodiments in which this cannot be achieved, averaging of the two inputs can be performed instead of summing.

The FIG. 7A embodiment shows a filter following the summation (averaging) module. This can be an oct-axis filter, a criss-cross filter, or another form of high pass filter, and serves to attenuate signal components that likely provide more noise than information.

Figure 7B:
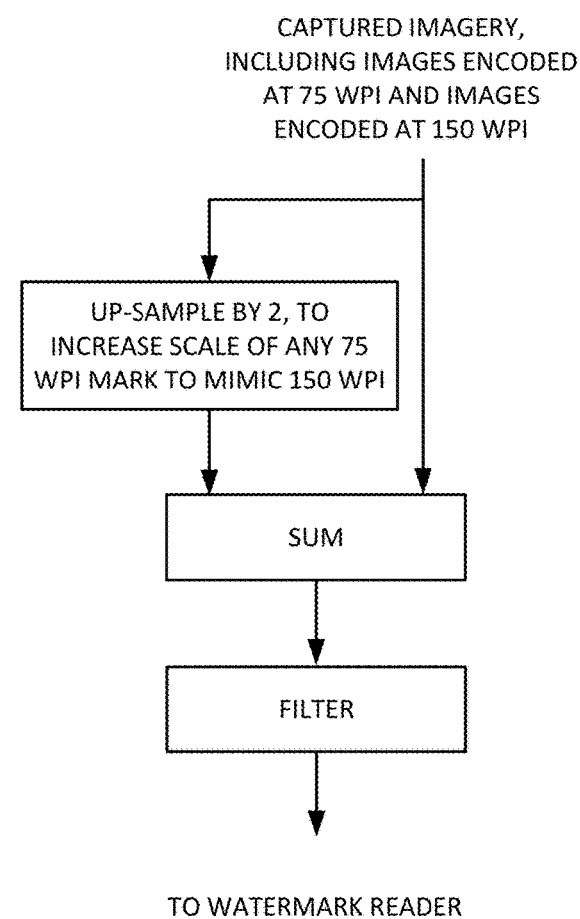

A related embodiment uses upsampling, as shown in FIG. 7B. Input imagery is up-sampled by a factor of 2 and summed with the original imagery. The result is provided to a digital watermark detector configured for 150 WPI watermarks. If the input imagery actually does include a 150 WPI watermark, it will be detected as-is in the summed data. If the input imagery depicts a 75 WPI watermark, its up-sampling by two effectively expands the data set, mimicking a 150 WPI mark—again suitable for detection by the detector.

Naturally, such principles can be extended to watermarks of different resolutions, and can be extended to three or more different watermark resolutions.

Another approach to this issue (i.e., of input imagery potentially including watermarks printed at different resolutions) is to employ a watermark reader optimized for an intermediate resolution. For example, an average of the different print resolutions can be formed, with each component resolution weighted by its prevalence. For example, if a quarter of the watermarked items sold by a supermarket are marked at a print resolution of 150 WPI, and three-quarters are marked at a print resolution of 75 WPI, then a watermark reader can be employed that is optimized for a print resolution of 94 WPI.

Still another approach is to excerpt a plurality of different candidate blocks from input imagery and analyze each for watermark data, where one or more blocks are analyzed on the basis of one print resolution, and others are analyzed on the basis of another print resolution. In the example just-given, four blocks may be excerpted. A random three of these may be analyzed looking for watermarks printed at 75 WPI, and the other may be analyzed looking for watermarks printed at 150 WPI. (Each analysis can include a down-sampling, or interpolation, operation that is predicated on a particular print resolution.) The candidate blocks may be chosen from the input imagery based on clues indicating an increased likelihood of watermark signal in those regions. Some such techniques are detailed, e.g., in U.S. Pat. Nos. 6,442,284 and 7,013,021.

Identifying Watermark Protocol

Figure 8:
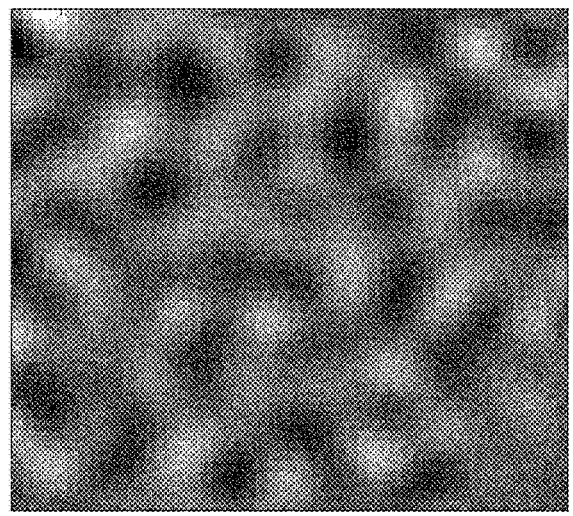
FIG. 8 illustrates an excerpt of a 2D reference signal in the spatial (e.g., pixel) domain.

As noted, an illustrative reference signal comprises a known 2D pattern that a decoding system can locate, e.g., in the Fourier domain, and use to determine the affine pose of the optical code (e.g., scale, rotation, x-translation and y-translation) as depicted within captured imagery. A sample reference signal is shown in its spatial domain representation, in excerpted, magnified form, in FIG. 8. This signal is defined by a sum of dozens of 2D spatial sinusoids of different frequencies and phases (and optionally amplitudes). Such reference signal is commonly sampled into a square array of 128×128 discrete elements, each having a corresponding value. The value can be expressed as an 8-bit greyscale value, in the range of 0 (black) to 255 (white). In other implementations the sampled values are real-valued, and scaled to a range between about −1 (black) and +1 (white).)

In a particular embodiment, some or all of the 16,384 elements in the reference signal block are sorted by value to generate an ordered list, e.g., including the 4096 darkest elements (dark extrema). Each entry in the list is associated with an ordinal position (1, 2, 3 . . . ), and {X,Y} data specifying the element's position within the block, by column and row. Table I shows an excerpt of such an ordered list of locations:

TABLE I

| Rank | Value | {X,Y} Coordinates |
| --- | --- | --- |
| 1 | −0.948235 | {18,22} |
| 2 | −0.946431667 | {72,32} |
| 3 | −0.928626667 | {1,33} |
| 4 | −0.923843333 | {26,82} |
| 5 | −0.921176667 | {14,7} |
| 6 | −0.908235 | {33,73} |
| 7 | −0.89647 | {19,83} |
| 8 | −0.895686667 | {1,123} |
| 9 | −0.892548333 | {78,23} |
| 10 | −0.887843333 | {26,121} |
| 11 | −0.876863333 | {100,15} |
| 12 | −0.876078333 | {119,99} |
| 13 | −0.870588333 | {70,34} |
| 14 | −0.85098 | {87,65} |
| 15 | −0.850196667 | {34,108} |
| 16 | −0.836078333 | {98,73} |
| . . . | . . . | . . . |
| 4096 | −0.209411667 | {79,89} |

An illustrative optical code is formed as a pattern of dark marks placed at a selection of coordinate locations from Table I. In a particular embodiment, a first set of locations from the ordered list are all marked in the 128×128 block. This gives the decoding system a strong representation of the reference signal to aid in geometrically synchronizing the code for decoding. These locations are termed Fixed Locations, sometime abbreviated FL. A further, second set of locations from the ordered list are marked, or not, depending on the values of chips assigned to such locations by the scatter table. If a chip has a value of "0," a dark mark is formed; if a chip has a value of "1," no mark is formed. These locations are termed Variable Locations, sometimes abbreviated VL. In addition to conveying chip data, marks at these Variable Locations also serve to convey the reference signal—since they are positioned at block locations corresponding to dark extrema of the reference signal.

In a particular embodiment, the first set (FL) consists of 410 locations identified by Table I. These may be, e.g., locations ranked 1-410. The second set (VL) can consist of 820 locations identified by the table, e.g., those locations ranked 411-1230.

Figure 8A:
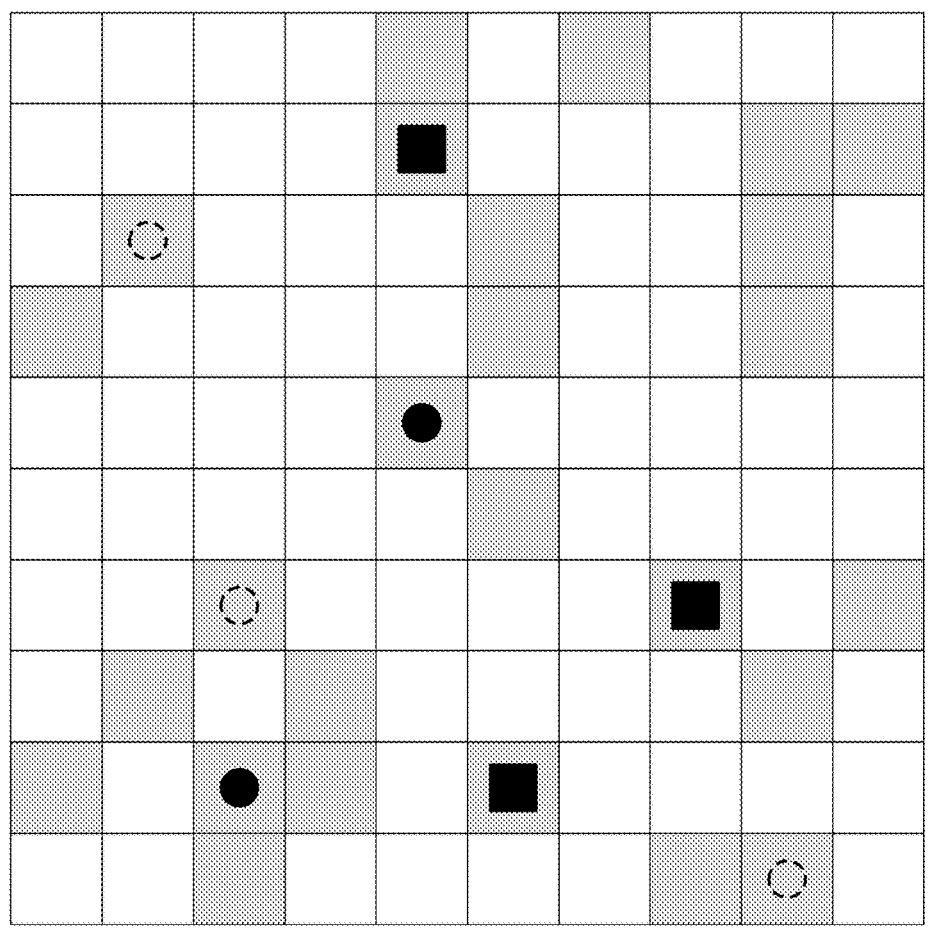
FIG. 8A illustrates an excerpt of a sparse mark, depicting marks at Fixed Locations, and selected marks at Variable Locations.

FIG. 8A shows an excerpt from such an optical code. This excerpt depicts just 100 of the 16,384 locations in the complete code block. The Fixed Locations are indicated by the black-filled square marks. These locations are always marked. The Variable Locations are indicated by the circles. Some circles are marked (black-filled), indicating that chips assigned to such locations have a value of "4." Others are unmarked (unfilled), indicating that chips assigned to such locations have a value of "+1."

The elements in FIG. 8A that are shown with a grey background are the locations which are identified as reference signal extrema by Table I. About a quarter of the depicted elements are identified in this table. However, only a fraction actually are marked; most are left unmarked.

The number of Fixed Locations in the FIG. 8A excerpt (which may be termed NFL, for Number of Fixed Locations) is 3. As noted, the marks at these locations signify only reference signal. The number of Variable Locations in this excerpt (which may be termed NVL, for Number of Variable Locations) is 5. As noted, marks formed at these locations serve to represent both "0" chip data and reference signal extrema.

The count of Fixed Locations, plus the count of Variable Locations, yields a total number of candidate locations at which dark marks may be found. In the full exemplary code block, the total number of candidate locations is 410+820, or 1230.

(Note that the number of Variable Locations need not be equal to the number of bits in the signature data string. If the number of Variable Locations is less than the number of bits in the signature data string, then not all bits are represented (by corresponding chips). If the number of Variable Locations is more than the number of bits in the signature data string, then some bits may be represented by more than one chip. There is no requirement that each signature bit be represented equally in the mark—some signature bits may be represented by chips at two or more Variable Locations, while other signature bits may not be represented at all. In Table II below, in Protocol 1, about 450 of the 1024 signature bits are typically not represented at all—due to the limited number of Variable Locations. In Protocol 7, in contrast, only about 75 of the signature bits are not represented at all.)

In designing a code block (a.k.a. a watermark, or indicia), the number of marked locations within each block is often a design criterion. The total number of marked locations in a code block (call this number TML for Total Marked Locations) can be approximated as the sum of the number of Fixed Locations, NFL, plus half of the number of Variable Locations, NVL (since about half of the chips assigned to the Variable Locations have a value of "0.") That is:

TML≈NFL+0.5*NVL

Different applications are best served by different parameters of NFL and NVL. (Among the three parameters in the above equation, any two can be independent, and the third follows as a function dependent on the first two. This specification commonly refers to NFL and NVL as the independent variables when characterizing a watermark block.)

Some applications are best-served by blocks having a large count of total marked locations, e.g., in circumstances where the marks are of low contrast against the print substrate, thereby increasing risk of a read failure. Conversely, in applications where the marks are of high contrast, a lower count of total marked locations can be used.

Similarly, the ratio of Fixed-to-Variable locations can be tailored based on circumstances. For example, if the indicia conveys a relatively short message payload (e.g., a 14 digit GTIN), then relatively fewer Variable Locations are required, resulting in a higher Fixed-to-Variable ratio. Conversely, if the indicia conveys a relatively long message payload (e.g., a 14 digit GTIN, plus sell-by date data, plus item weight data), then relatively more Variable Locations are required, resulting in a lower Fixed-to-Variable ratio.

The print density of the code block can be signified by various metrics. One is the percentage of locations within a block that are marked. Such value is simply the ratio of the estimated Total Marked Locations, to the 16,384 locations in a 128×128 element code block, i.e.:

Print Density=TML/16,384

To handle the range of circumstances that may be encountered, a variety of encoding protocols can be defined, which variously have more or less Fixed Locations, more or less Variable Locations, and different ratios between Fixed and Variable Locations. The following table details an exemplary collection of encoding protocols, each with a different set of parameters:

TABLE II

| | NFL | NVL | NFL + NVL | TML | Fixed-to-Variable | Print Density |
|---|---|---|---|---|---|---|
| Protocol 1 | 410 | 820 | 1230 | 820 | 1:2 | 5% |
| Protocol 2 | 410 | 1640 | 2050 | 1230 | 1:4 | 7.5% |
| Protocol 3 | 410 | 2460 | 2870 | 1640 | 1:6 | 10% |
| Protocol 4 | 410 | 3280 | 3690 | 2050 | 1:8 | 12.5% |
| Protocol 5 | 820 | 1640 | 2460 | 1640 | 1:2 | 10% |
| Protocol 6 | 820 | 2460 | 3280 | 2050 | 1:3 | 12.5% |
| Protocol 7 | 1230 | 2460 | 3690 | 2460 | 1:2 | 15% |

To read one of these code blocks, as just-described, it is helpful to discern which protocol was used in its encoding. The protocol indicates which locations can be used for geometric synchronization, which locations convey encoded message data, and which can be ignored altogether.

To illustrate, to decode an indicia formed according to Protocol 5, locations 1-820 in the ordered list of locations (i.e., sorted by associated reference value) are disregarded. They indicate the reference signal only (and were earlier used in assessing geometric synchronization). Locations 821-2460 are each examined to determine whether a mark is present or absent, signaling that a chip corresponding to that location has a value of "−1" or "+1," respectively. These chip values are then provided to the decoder to extract the indicia's payload. Locations 2461-16384 are ignored.

The problem thus becomes, given a depicted indicia, how to determine the values of NFL (i.e., 820) and NVL (i.e., 1640)? Once these are known, decoding can proceed by extracting "−1"s and "+1"s from locations NFL+1 through NFL+NVL, and providing same to the decoder.

This problem, of indicating the protocol used by a particular code, can be addressed in various ways. One solution is to signal which protocol is being used by customizing the reference signal to include, or omit, one or more signal components. As noted, a preferred reference signal includes an ensemble of several dozen spatial sinusoids of different frequencies and phases. If 26 different sinusoids, A-Z, are present, this can signal use of Protocol 1. If 25 different sinusoids, A-Y, are present (and sinusoid Z is absent), this can signal use of Protocol 2. If 24 different sinusoids, A-X, are present (and sinusoids Y and Z are absent), this can signal use of Protocol 3. Etc. This approach may be termed a customized-reference-signal approach to indicia classification.

A second solution employs an algorithm that examines statistics of signal values in different ranges of the ranked locations through the watermark block, e.g., in ranges of locations 1-410, 411-820, and 821-1230. This requires first identifying where these ranked locations are found in the image data, and then examining the values of the image data at these locations.

Identifying the ranked locations first requires determining the affine parameters that define the scale, rotation, and x/y translation of the watermark block as depicted within the image data. Suitable methods are detailed in earlier-cited patent documents U.S. Pat. Nos. 6,590,996, 9,959,587, and 10,242,434, and in pending application Ser. No. 16/141,587, filed Sep. 25, 2018 (published as 20190266749). Once these affine parameters are known, stored data listing the ranked locations is accessed, identifying the coordinates of each ranked location within the block (e.g., the data of Table I). Each of these coordinate pairs is translated into the frame of reference of the image data, and a weighted sum of the four nearest data points in the image data is generated to produce an interpolated value for each of the coordinate locations in the ranked list.

Figure 9:
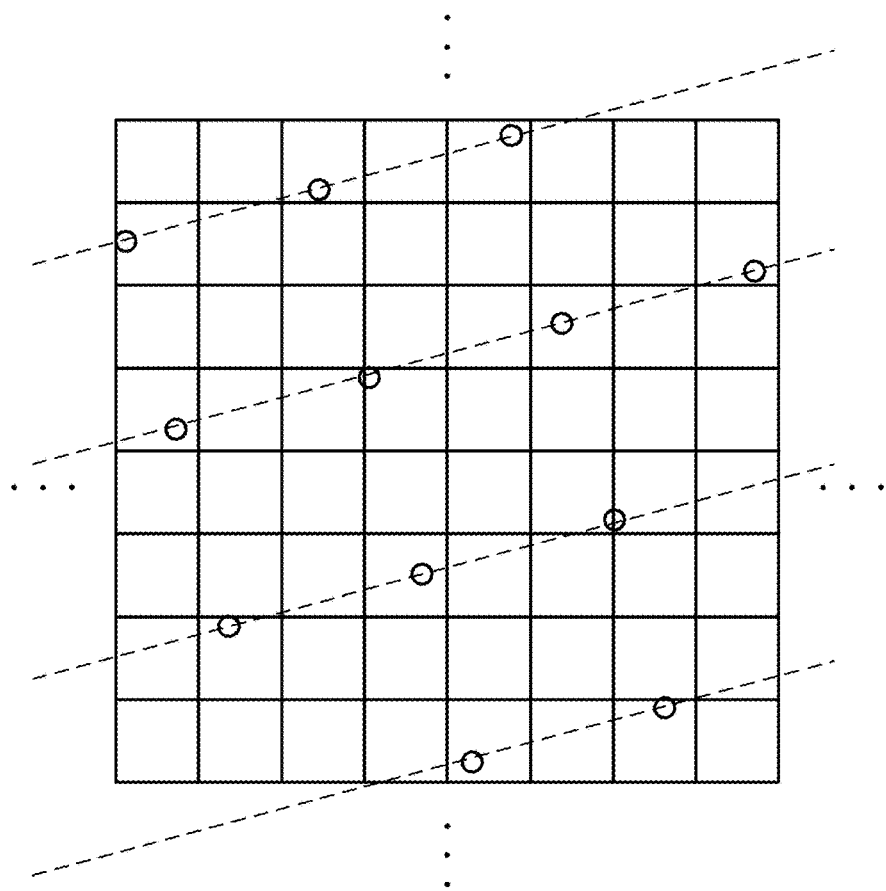
FIG. 9 illustrates how locations of watermark elements (waxels) are sampled (interpolated) from camera-captured image data.

This interpolation process is made clearer from FIG. 9, which shows an array of square pixel elements excerpted from camera-captured imagery. Each pixel element has a value. Overlaid is an array of small circles. Each circle indicates the center of one watermark element, i.e., a location within a 128×128 element optical code block. (The dashed lines indicate the orientation of rows in the watermark block.) To discern the value of captured imagery at each of these circles (i.e., the value of each of these watermark elements), a weighted-sum is calculated based on four pixel values: the pixel in which the circle is located, and the three other pixels nearest that circle. Bilinear or bicubic interpolation can be employed.

Watermark element values ("waxel" values) are extracted in this manner from the image data. A mean of the values for ranked locations 1-410 is computed. If the image data bears a watermark according to one of the protocols, all of these locations should be marked (i.e., these are the Fixed Locations). If the mean value for these locations is under 60 (i.e., tending to the dark end of 8-bit greyscale), and their standard deviation is under 20 (where both of these values are empirically-determined), then these locations can be inferred to be all marked. In this case, statistics from the second and third ranges (411-820 and 821-1230) are similarly computed, and compared with the statistics from the first range, to determine if the mean and standard deviation statistics of the former are within expected tolerances (e.g., +/−50%) to those of the latter. If the second range is within such tolerance but the third range is not, then the indicia can be inferred to have an NVL value of 820 (i.e., locations 1-820 are all marked, but locations 821 and beyond are not all marked). Analogous tests are then conducted to determine whether locations 821-1640 have similar statistics to locations 1641-2460. If so, the indicia is inferred to be of Protocol 6; else it is Protocol 5.

Such approach may be termed a statistical-inferencing approach.

Additional information useful in such methods is detailed in cited application Ser. No. 16/405,621, filed May 7, 2019 (published as 20190332840).

Additional algorithms to determine the NFL and NVL values are detailed below.

Algorithm A

In algorithm A, the locations in the ranked list (Table I) are examined within the image data (e.g., as detailed above) for the presence of dark marks. Dark marks can be discerned based on comparison of the image data values at the listed locations, with a threshold value, such as 60 or 128 in an 8-bit greyscale representation of the image data), and a cumulative count of dark marks—as a function of position in the ordered list—is compiled.

Figure 10:
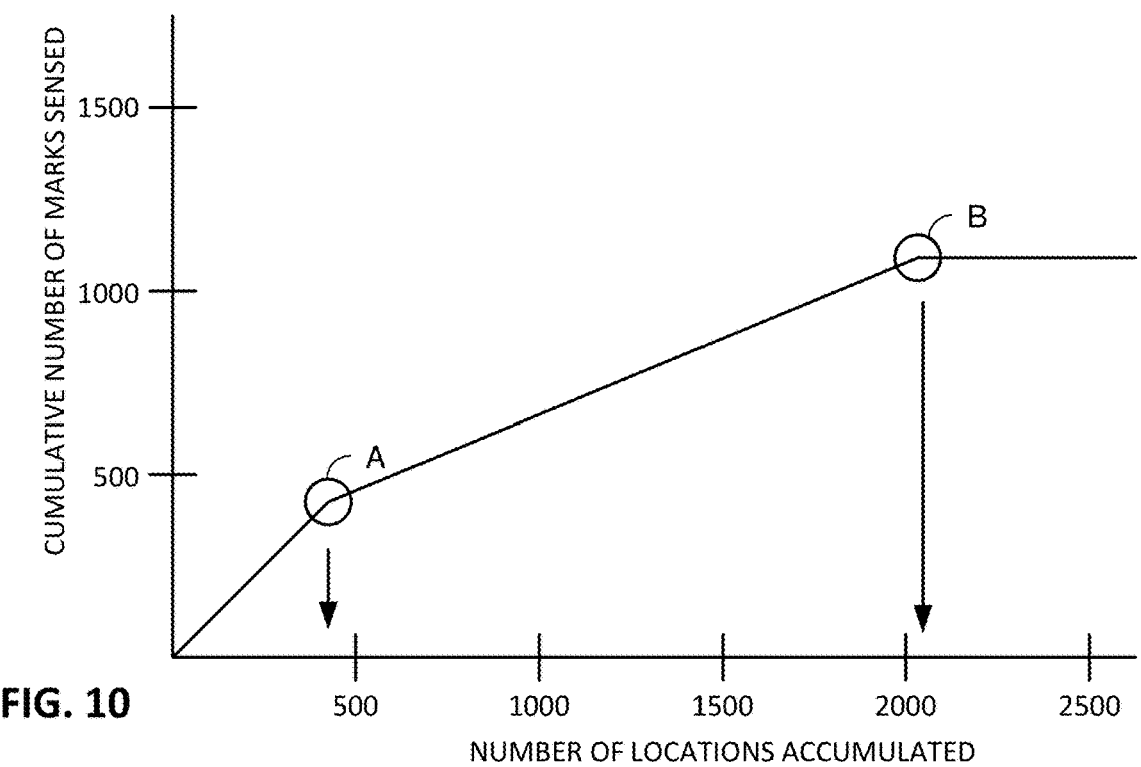
FIG. 10 plots an array of accumulated-dot-contribution data, revealing two "knees" A and B, indicating a count of Fixed Locations and Variable Locations.

An idealized cumulative count is plotted in FIG. 10. For the first several hundred locations, each successive location adds one mark to the cumulative count. This corresponds to the first set of locations (e.g., locations 1-410), which are always marked to signify the reference signal.

Then, at a "knee" point indicated by the circle A, things change. No longer does the accumulated-dot-contribution continue to rise with each successive location. Instead, on average, the count rises by one for every two successive locations. This region of data corresponds to the second set of locations (e.g., 411-2050), which are marked—or not—depending on the binary value of the chip assigned to that location. Since about half of the locations are marked, the curve rises at about half the rate as formerly.

Then, at a knee point indicated by the circle B, things change again. The accumulated-dot-contribution does not rise further. Successive locations are (ideally) all unmarked; the cumulative count stays fixed.

The locations of circles (knees) A and B indicate, on the horizontal axis, the values of NFL and (NFL+NVL)— here about 410 and 2050. These data indicate that the indicia depicted in the image data was encoded with Protocol 2 of Table II.

As noted, the FIG. 10 curve is idealized. In actual practice, the lines are not straight, but noisy. For example, due to imperfect geometrical registration, not all dark marks are correctly identified as such. And the knees, A and B, on the depicted curve, where things change, may not occur exactly at values of 410 and 2050, due to particular chip values and noise.

The locations of the knees A and B may be identified on the basis of a second derivative. That is, a discrete second derivative value can be computed at points along the accumulated-dot-contribution curve of FIG. 10 (e.g., based on a sliding window of +/−10, 20 or 50 samples). The two locations where the second derivative takes its largest negative excursions should correspond to the knees A and B.

Figure 11:
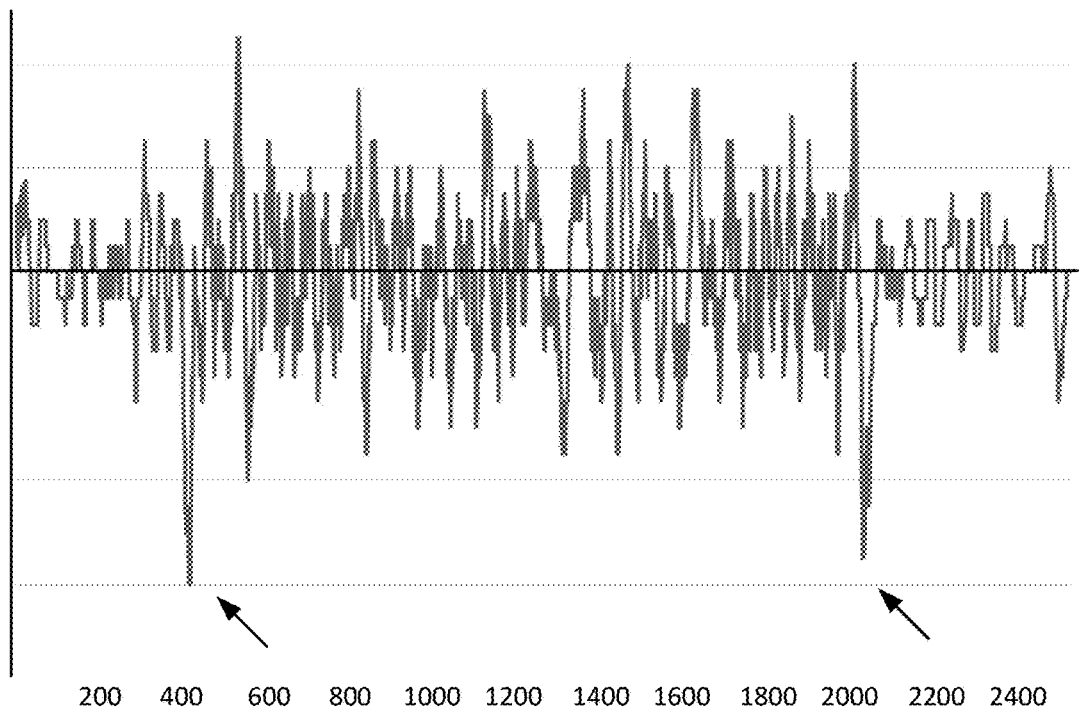
FIGS. 11, 11A and 11B show second derivative curves produced from arrays of accumulated-dot-contribution data.

FIG. 11 exemplifies this method. The second derivative curve has two pronounced dips—at 410 and 2050, shown by the two arrows, corresponding to the two knees A and B. The left-most value is taken as identifying the value NFL, and the right-most value is taken as identifying (NFL+NVL). The values indicated by these derivative extrema are checked against the NFL/(NFL+NVL) data pairs found in Table II, which characterize candidate protocols. If the derivative extrema match one such pair within specified tolerances (e.g., +/−5), then this indicates that the indicia is encoded according to the matching protocol.

Noise, however, is a problem.

One enhancement is to Gaussian-filter the second derivative data (or first derivative data on which it is based). This eliminates some spurious outlier data.

Figure 11A:
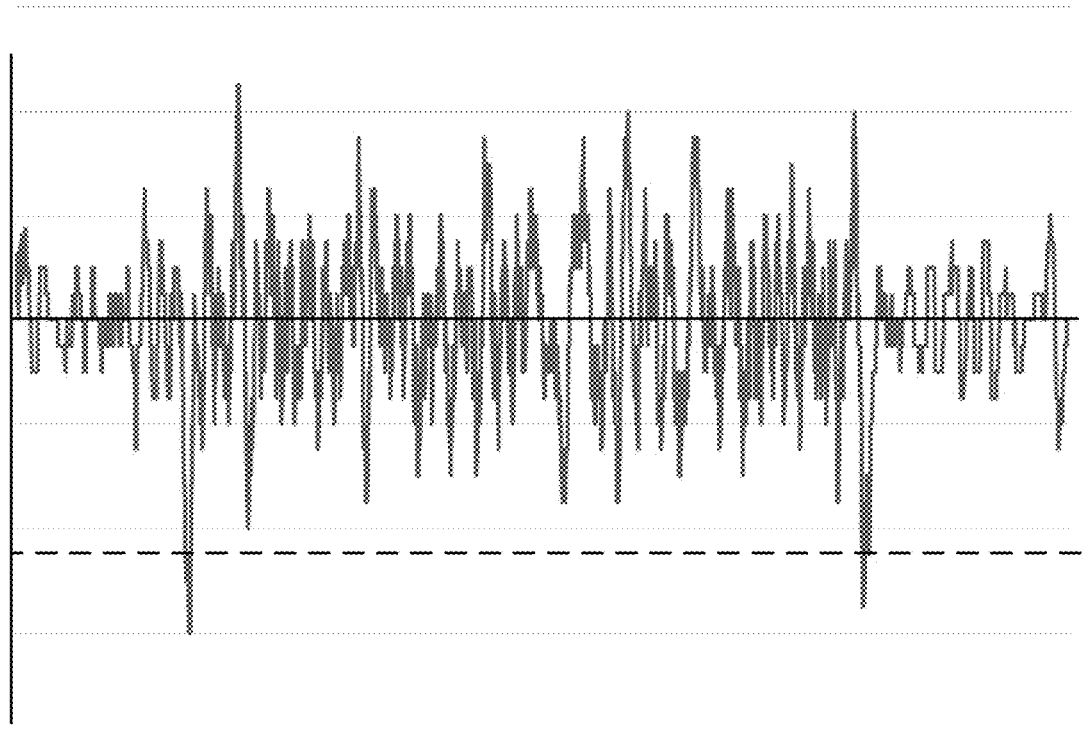

Another enhancement is not simply to identify the two lowest dips in the second derivative curve, but to additionally check that each of those dips drops below an empirically-determined threshold value—as shown by the dashed line in FIG. 11A. Dips not reaching this threshold are disregarded. This helps filter out more noise-related problems.

Sometimes, however, neither of these enhancements is sufficient. Noise can still cause phantom dips that may indicate erroneous locations for knees A and B. Accordingly, a third enhancement can alternatively, or additionally, be used: consider only dips within specified ranges along the horizontal axis, i.e., ranges near the locations where the two knees are expected to be found, per the definition of the different protocols (i.e., Table II).

Figure 11B:
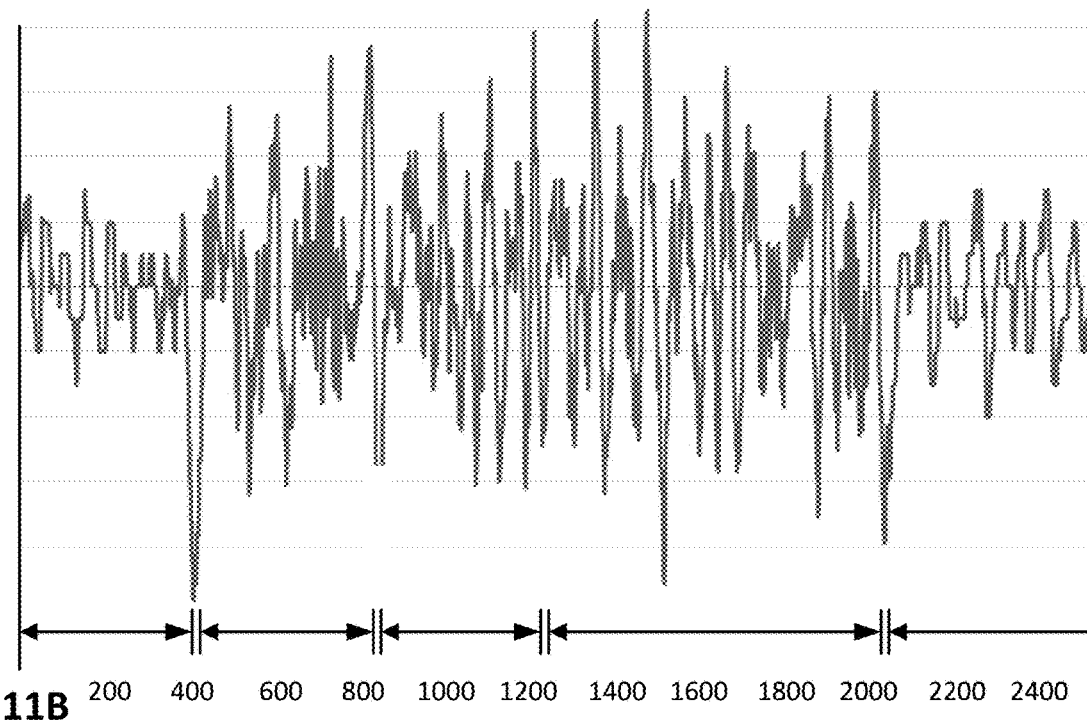

For example, a dip may be found around 410 on the horizontal axis, or around 820, but not near 500, or 600, or 700. Accordingly, only dips found within a small range (e.g., +/−10 or 20) of the possible dip locations (i.e., NFL and NFL+NVL) are considered. Dips found outside those ranges are disregarded. The largest two dips found within two such ranges are taken as indicating knees A and B. Such an arrangement is shown in FIG. 11B, with the excluded ranges shown by the arrows along the bottom, and the permitted range shown by the paired parallel lines. Note that the sharp dip near 1500 on the horizontal axis is disregarded, since it does not coincide with a permitted range.

Algorithm B

A related algorithm again is based on second derivative values along the accumulated-dot-contribution curve of FIG. 10, etc. This algorithm, however, examines the second derivative values at discrete points, namely the candidate knee locations: 410, 820, 1230, 2050, 2460, 3280, and 3690. The largest two second derivative values are identified among this set of locations. The left-most on the plot is again taken as knee A and the other is taken as knee B. If such a pair of knee values is found among the seven protocols in Table II, then the protocol has been identified.

If desired, a threshold test can be applied to each of the derivatives (seven in this case). If there are not at least two values that pass the threshold test, then the results can be discarded.

Algorithms A and B may collectively be regarded as second-derivative approaches to indicia classification.

Algorithms A and B presume the optical code block is first geometrically-registered, based on detection of the reference signal within the captured imagery. As noted, known synchronization methods can be used. Such methods typically take into consideration all of the image data within a neighborhood that is being analyzed for the presence of watermark data.

Better geometric registration can often be achieved by a second synchronization operation—once the protocol has been identified by one of the algorithms detailed herein. As noted, dark marks are printed at extrema of the reference signal. The geometric registration can be finely adjusted based on marks at the Fixed Locations and Variable Locations employed by the particular protocol being used (e.g., at locations 1-2050, in the case of Protocol 2), while other markings in the captured imagery can be ignored as noise. One technique for such fine adjustment comprises iteratively adjusting the x- and y-components of the affine translation, while checking at each step to determine whether correlation of the marks at the Fixed Locations and Variable Locations, with the known reference signal, increases or decreases. If a fine adjustment of one parameter, e.g., a fine adjustment of x-translation in a positive direction, decreases correlation, then a similar adjustment in an opposite direction, i.e., fine adjustment of x-translation in a negative direction, can be tried. If an adjustment increases a correlation, then a further such adjustment of the same type can be made, followed by others, until no further improvement is achieved. A next parameter can then be similarly adjusted, etc. Additional information on such a method is included in U.S. Pat. No. 6,975,745.

In a preferred embodiment, re-registration is effected on a sub-block basis. For example, a 128×128 watermark block is divided into 16 sub-blocks—each an array of 32×32 locations. Affine parameters for the global 128×128 block, as determined by one of the detailed registration methods, are taken as a starting point for each sub-block. Each sub-block is then separately re-registered, by adjusting the x- and y-translation (and optionally other parameters) in the iterative fashion just-described—seeking to increase correlation of the Fixed Location and Variable Location dark marks in the re-registered sub-block, with the corresponding excerpt of the reference signal.

After the image data has been re-registered, based on candidate marking locations specified by the identified protocol, decoding of the payload data can proceed.

Algorithm C

Still another algorithm attempts registration and classification of the indicia protocol based on attempting application of successive ones of the candidate protocols.

This algorithm conducts an initial registration operation on the basis of the image data, without regard to the protocol used. An initial set of affine parameters is obtained, enabling tentative identification of the 16,384 locations in the watermark block.

The algorithm may next assume that the input image data is encoded according to Protocol 1. It next adjusts the initial geometric registration—considering only marks found at locations 1-1230. Again, sub-block adjustment of registration can be employed. The image data is then re-sampled (interpolated), based on the adjusted affine registration parameters, and sample values from Variable Locations 411-1230 are provided to the decoder for extraction of the watermark payload.

If the decoder is able to decode a payload, then the payload is almost assuredly the correct one; the robust redundancy and error correction included in the detailed system make false decodes essentially a nullity. Thus, if the decoder is able to decode a payload, the algorithm can terminate.

If no payload is output from the just-described steps, the algorithm tries again—this time based on an assumption that the input image data is encoded according to Protocol 2. That is, the algorithm again adjusts the initial geometric registration—now considering only marks found at locations 1-2050. The image data is then re-sampled, based on the adjusted affine registration parameters, and sample values from Variable Locations 411-2050 are provided to the decoder for extraction of the watermark payload.

Again, if a watermark payload is decoded, then the algorithm can terminate. Else, the algorithm continues—successively trying others of the protocols (i.e., Protocols 3, 4, 5, 6, and 7), and terminating when an output payload is produced.

Algorithms according to this method may be termed successive-trials approaches to indicia classification.

In a variant algorithm, decoding is not attempted after re-registering the image data based on each candidate protocol. Instead, after re-registering the image data based on Protocol 1 (e.g., based on locations 1-1230), an array of accumulated-dot-contribution data is compiled, as in Algorithms A and B. Second derivative data is then computed at a range of locations around the two knees of Protocol 1. For example, derivative data may be computed for the range 400-420, and for the range 1220-1240. The maximum second derivative value in the first range is summed with the maximum second derivative value in the second range, giving a score for Protocol 1.

The image data is then re-registered on the basis of Protocol 2 (e.g., using marks found at candidate locations 1-2050), and the second derivative is computed at ranges centered on the two knees of this protocol (i.e., 410 and 2050). Again, the maximum second derivative values for these two ranges are summed—giving a score for Protocol 2.

This process continues for each of the seven protocols, yielding a score for each. The highest of these seven scores then indicates which of the seven protocols is being used. Decoding can then proceed, on the basis of the Variable Locations associated with the indicated protocol.

As noted, each of the Variable Locations defined by a particular protocol is marked, or not, to signal the "−1" or "+1" value of a chip, corresponding to a bit value of the 1024-bit signature string. (In the illustrative embodiment, each bit of the scrambled signature string generates 16 such chips, by XORing the bit with a −1/+1 PRN sequence of length 16. A scatter table maps each chip thereby produced to a respective location in the 128×128 watermark block, i.e., 16,384 locations in all.)

In sparse watermark indicia, most of these 16,384 chips are unused. Only the chips that are mapped, by the scatter table, to the Variable Locations defined by the protocol are used (and only about half of these actually result in a printed mark).

Decoding employs a reciprocal process. Variable Locations for the protocol being used are examined in the image data, and found to signal a "+1" (unmarked) or "−1" (marked). The PRN sequence is used to unscramble the chips—identifying values for elements of a 1024-element extracted signature string.

Many signature string bit values are not represented at all in the sparse mark—there are too few Variable Locations. (The decoder can correctly decode the payload despite the absence of multiple elements in the extracted signature string, due to the forward error correction coding that is used.) Other signature string bit values are represented by a single chip at a single Variable Location. Other signature string bit values may be represented by chips at plural Variable Locations.

In this latter case, more confidence can be gained about the extracted signature element value—provided the chips all indicate a common value. This can be done by summing the unscrambled −1/+1 chip values. If unscrambled chip values from two locations each have a value of −1, they sum to −2. The corresponding element of the extracted signature string is thus assigned a value of −2. Similarly, if unscrambled chip values from two locations each have a value of 1, they sum to 2, and this value is assigned to the corresponding element of the extracted signature string. Both sums indicate, to the decoder, increased confidence in the corresponding element of the extracted signature.

If two unscrambled chip values from two locations have opposite values, −1 and 1, they sum to 0. This indicates, to the decoder, no information about the corresponding signature bit value.

A further metric can also be employed to indicate confidence to the decoder about bits of the extracted signature: the reference signal strength expressed in the sub-block from which associated chips were derived.

As noted, each watermark block may be viewed as an array of 16 32×32 sub-blocks. A reference signal strength metric can be produced by correlating each sub-block of geometrically-registered image data with the corresponding reference signal expressed in that sub-block. The greater the correlation, the greater the confidence in chips extracted from that sub-block. Each such correlation value can be applied as a weight to the −1/+1 unscrambled chip values extracted from that sub-block. Thus, if two unscrambled chips for element 998 in the signature string both have a value of +1, and one comes from a sub-block with a correlation value of 0.5, and the other comes from a sub-block with a correlation value of 0.75, then element 998 in the extracted signature string is assigned a value of 1.25. Such operation is performed for every element position in the extracted signature string, before the string is submitted to the decoder for decoding. An array of real values, of length 1024, is thus submitted to the decoder (several of which values may be zero).

It will be recognized that the sub-block correlation value will largely depend on the Variable Locations, which constitute half or more of the signaling locations. Those Variable Locations may be marked, or not, depending on chip values. This uncertainty makes the just-described correlation value less useful than it might be.

To redress this shortcoming, it can be preferable to correlate a sub-block of the reference signal with just the image data sampled from the Fixed Locations. Other locations in the sub-block of image data (i.e., the Variable Locations and the unused locations) are disregarded, or set to a fixed value. If a full watermark block has 410 Fixed Locations (e.g., per Protocols 1-4), and a particular sub-block has 22 Fixed Locations, then a correlation based on these 22 locations—alone— can serve as a sub-block confidence measure.

Still further, the real reference signal values corresponding to these 22 image data locations will vary based on the sum of the dozens of reference signal sinusoids at those locations. These varying values are not indicative of confidence in the sub-block, but rather are features of the real reference signal itself. Accordingly, a still more useful correlation value is based on an assumption that the reference signal at each of these 22 locations is absolutely black. In this case, sub-block correlation is proportional to the average of the image data values at the 22 Fixed Locations. An average of zero (absolute black) is ideal. The darker these locations are, the better the correlation. In this case, a confidence metric for the sub-block, ranging from 0 to 1, can be expressed simply as:

$$1-(\text{mean value of Fixed Locations in sub-block})$$

Again, such confidence value can weight each of the descrambled chips discerned from the sub-block, before such chip values are summed and compiled to form the extracted signature string submitted for decoding.

The methods as just-described can be employed in all the embodiments detailed herein.

(Additional information on a confidence metric based on local reference signal strength is included in U.S. Pat. No. 10,506,128, where the metric is termed Reference Pattern Strength.)

Algorithm D

A fourth algorithm for determining the particular protocol used by a watermark indicia in captured imagery is not based on a second derivative approach. Nor is it based on a successive-trials approach. Rather, an analysis based on first derivative data (i.e., slopes of the accumulated-dot-contribution curve) is employed.

As before, an initial set of affine parameters is determined from the input imagery, characterizing rotation, scale and translation of an encoded watermark depicted in the imagery. As before, an array of accumulated-dot-contribution data is compiled—by interpolating among the image data at coordinate locations within the watermark block identified in the ranked list of reference signal extrema (Table I), using the initial affine parameters. Such an array of accumulated-dot-contribution data is plotted in FIG. 12.

In this algorithm, the slope of the accumulated data is determined for segments between possible knee points. As indicated by Table II, the possible knee points, where NFL and (NFL+NVL) can occur, are 410, 820, 1230, 2050, 2460, 3280, and 3690. These slopes are indicated just above the plot of FIG. 12.

An absolute difference δ between each successive pair of slopes is then computed. These are identified above the plot of FIG. 12. The two largest values of δ, shown in solid boxes, indicate the two knee points. The first (the left-most) indicates the value of NFL (here 410). The second (the right-most) indicates the value of (NFL+NVL), here 2050.

As before, once the parameters NFL and NVL are identified, chip data is extracted from locations NFL+1 through NFL+NVL, and processed as described above, to create an extracted signature string that is provided to the decoder.

Methods based on first derivatives, or slopes, may be termed first-derivative approaches to indicia classification.

In a variant algorithm, the array of accumulated-dot-contribution data is not simply incremented in unit steps (or not incremented) based on whether marks are discerned at successive locations in the ranked list. Instead, a more nuanced approach is taken, considering: (a) the darkness of the mark, and/or (b) the confidence metric for the sub-block in which the mark is found.

In a particular embodiment, both of these just-noted factors are considered. Again, processing is performed on a sub-block basis. For each 32×32 sub-block identified by the initial registration parameters, a re-registration operation is conducted. Since the protocol is not yet known, the number of Fixed Locations in the full watermark block is also not yet known. Re-registration thus proceeds based on a compromise figure, namely the darkest 64 locations found in the sub-block, per the Table I ordered list of darkest watermark coordinate locations. (This number typically spans most of the Fixed Locations, and perhaps a small percentage of the Variable Locations.) A confidence score is then computed for the re-registered sub-block. This score (in the range of 0 to 1) is computed as detailed above, and is based on the darkest 32 locations found in the sub-block, per the ranked list. (These locations will be mostly, or exclusively, Fixed Locations.)

The accumulated-dot-contribution data is then compiled by first examining the location in the image data corresponding to the top-ranked dark location in the 128×128 watermark block. The image data value at that location is weighted (multiplied) by the confidence value of the sub-block in which it is located. The resulting value serves as the first element of the accumulated-dot-contribution array. The process then repeats for the second-ranked dark location, to define the second element of the accumulated-dot-contribution array. And so forth with the third- and following ranked dark locations, until all ranked locations have been considered. The accumulated-dot-contribution data thereby compiled is then processed as detailed above, to determine slopes between each of the possible knee points. Differences between adjoining slopes are then computed, to identify the two highest values—indicating the locations in the array of the first knee (NFL) and the second knee (NFL+NVL).

The weighted data from the array, at locations (NFL+1) to (NFL+NVL), can then shifted, if needed, to span both negative and positive numbers (e.g., dark marks are represented by negative numbers). Each represents the value of a chip. Chips can be descrambled and combined, as described earlier, to generate estimates of the signature string bits to which they correspond. (The chips were earlier confidence-weighted, in this particular embodiment.) An extracted signature string thereby formed is then submitted to the decoder to obtain the corresponding watermark payload data.

Oct-Axis Implementations

In certain embodiments, the captured image data is processed by a non-linear filter, such as oct-axis filtering, prior to the operations described herein.

As is familiar to artisans from the literature (including cited patent documents 20180005343 and 20190266749), oct-axis filtering involves comparing the value of a center pixel to values of its 8 surrounding neighbors. If the value of the center pixel is greater than the value of a neighbor, the oct-axis value is incremented by one. If the value of the center pixel is less than the value of a neighbor, the oct-axis value is decremented by one. Possible oct-axis values are thus integers in the range −8 to 8.

If a dark pixel is surrounded by 8 light pixels, an oct-axis value of −8 will result. As noted, the registration process involves determining affine parameters that describe presentation of a watermark block within captured image data (e.g., detailing rotation, scale and x/y translation). The captured image data can then be interpolated to determine values at points corresponding to the centers of the 128×128 elements of the watermark block.

The following discussion details a particular oct-axis based implementation of Algorithm D. It will be understood that the other algorithms can be similarly implemented on the basis of oct-axis-filtered image data.

After establishing an initial estimate of the affine parameters characterizing presentation of a watermark block in captured imagery, the original image data is sampled and interpolated to yield values for each of the 128×128 locations in the watermark block. Corresponding oct-axis values are then computed for each of these locations. These data are stored for later use.

Each 32×32 watermark sub-block is then geometrically re-registered on the basis of the 64 watermark locations within that sub-block that are identified from stored reference data (e.g., Table I) as being the darkest. This re-registration process can comprise the following operations:

Identify the 64 points of interpolated image data at which the darkest 64 watermark elements are believed to be centered. If there is any mis-registration, dark spots will not be perfectly centered at each of these 64 locations—they will be shifted off-center in some direction.

Figure 13A:
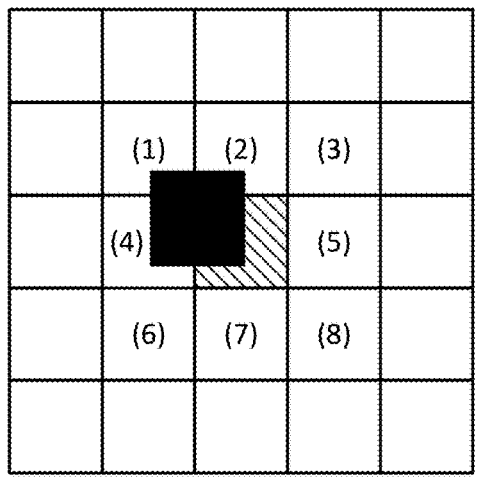
FIGS. 13A-13D illustrate a method for refining x- and y-translation parameters of an affine transform, describing presentation of a watermark block within captured imagery.

FIG. 13A illustrates. The array of squares identifies the interpolated watermark element locations, i.e., after initial registration. The cross-hatched location indicates one of the 64 locations where a dark mark is expected to be found. However, the mark is actually displaced a bit to left, and is also displaced a bit vertically. We want to refine the registration/interpolation of the image data so that the dark mark appears in its expected location.

To do this, we refer to oct-axis values for each of the 8 locations surrounding the initially-registered watermark element in which the center of the dark mark is actually found. Collectively, these 8 oct-axis values will reveal the direction in which the registration should be adjusted, in x- and y-translation, to better position the dark mark in its expected location.

In the FIG. 13A case, the center of the actual dark mark is located within the boundaries of the center element of the depicted watermark elements, as initially registered. The 8 locations around this center element are labeled (1)-(8) in FIG. 13A. Location (1) is at an [x,y] offset of [−1,1]; location (2) is at an offset of [0,1]; etc. Oct-axis values are computed for each of locations (1)-(8).

Figure 13B:
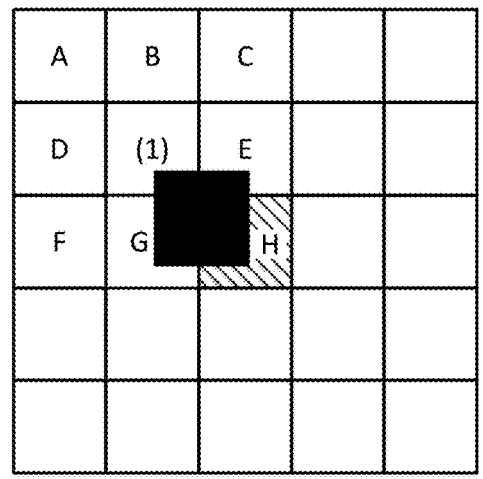

The oct-axis values for elements of this initially-registered watermark block were earlier computed. To summarize, the oct-axis value of depicted location (1) was determined by comparing its value against each of its eight neighbors (labeled A through H in FIG. 13B). Location (1) has some darkness, so its value may be 223 in 8-bit grey-scale. Locations A, B, C and D are all white in this example, so have values of 255. Since location (1) is smaller in value than each of these four locations A-D, each comparison contributes −1 to the oct-axis sum, for a sub-total of −4.

Location E is slightly darker than location (1), so the comparison leads to a positive increment, bringing the sub-total oct-axis value to −3.

Location F has a value of 255, bringing the sub-total oct-axis value to −4.

Location G is darker than location (1). Likewise, location H is darker than location (1). These final two comparisons bring the total oct-axis value for location (1) to −2.

Figure 13C:
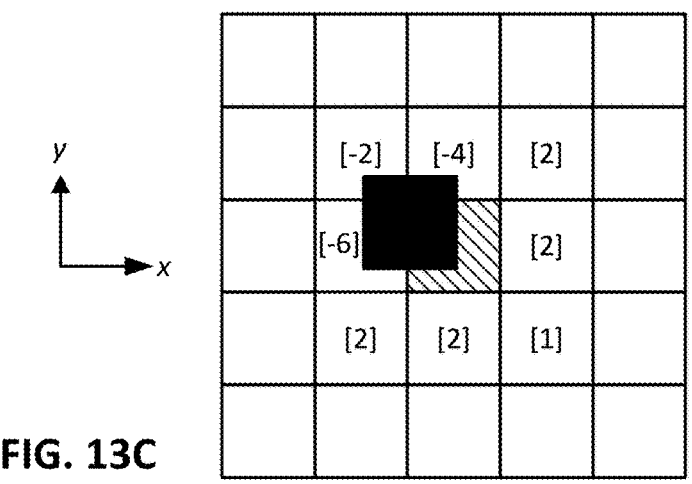

This result of −2 is shown in brackets towards the upper left corner of FIG. 13C. Oct-axis values for the other 7 locations surrounding the expected dark location are similarly shown in brackets in FIG. 13C.

The direction the dark mark is misregistered (i.e., offset in +y, +x, −y or −x) is indicated by the direction in which the largest negative oct-axis value(s) is found. Along the top row, in the direction indicated as +y from the center location, the oct-axis values are −2, −4 and 2, summing to −4. Along the right column, in the direction indicated as +x from the center location, the oct-axis values are 2, 2 and 1, summing to +5. Along the bottom row, in the direction indicated as −y from the center location, the oct-axis values are 2, 2 and 1, summing to +5. Along the left column, in the direction indicated as −x from the center location, the oct-axis values are −2, −6, and 2, summing to −6. This last sum is the most negative of the four, indicating that dark mark is primarily offset in the −x direction.

To correct this offset, the affine parameters describing how the captured image data should be interpolated, to synchronize to the mark placement, should be shifted (translated) in the −x direction.

Exemplary corrective translations are typically in the range of 0.2 to 0.4 watermark elements (at the scale indicated by the earlier-determined affine parameters), although of course smaller and larger values may be used in other implementations. Consider a corrective translation of 0.2 waxels, in the −x direction in this case, as exemplary.

Figure 13D:
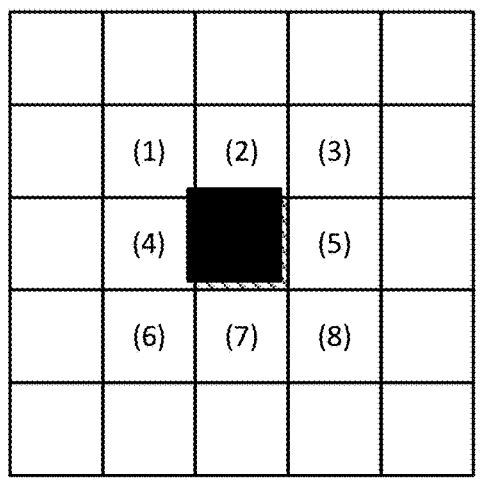

This is the direction of correction for this one mark. The computation is repeated for the darkest 64 locations identified for the 32×32 sub-block by the stored data (Table I). Many will indicate the same offset direction. Others may indicate offsets in the +y, −y or +x directions. These 64 offsets, each of magnitude 0.2 waxels, are averaged to yield a net translation refinement for the entire sub-block. This translation refinement may include both x and y components, of different magnitudes. The net corrective shift in x- and y-translations, based on data computed from the 64 locations, may yield a refined registration as shown in FIG. 13D.

This process can be performed one or more times. In each cycle, the original image data is re-sampled and -interpolated in accordance with the updated affine translation data (including refined x/y translation), and new oct-axis values are generated. Exemplary embodiments perform this re-registration operation 2-10 times in total, but more iterations can be used—particularly if smaller steps (i.e., steps smaller than 0.2 waxels) are used. In other embodiments, iteration continues until the magnitude of the net translation refinement falls below a fixed threshold value, such as 0.1 waxels.

In a variant embodiment, the procedure detailed above indicates the direction of primary offset (−x in this example), and also the direction of a secondary offset. The secondary offset direction is identified by determining which of the two directions adjoining the primary offset direction (i.e., +y and −y in this example) has the most-negative aggregate sum of oct-axis values. Recalling the sums computed above, the sum of oct-axis values in the +y direction is −4, while the sum of oct-axis values in the −y direction is +5. This indicates the secondary offset should be in the +y direction. The magnitude of this secondary offset can be proportional to the magnitude of the primary offset (i.e., 0.2 waxels), in the ratio of the secondary offset oct-axis sum (−4) to the primary offset oct-axis sum (−6). That is, the secondary offset should be ⅔ the magnitude of the primary offset, or 0.133 waxels in the +y direction in the present example. Again, such calculations can be performed for each of the 64 darkest locations in the sub-block, and the results averaged. The x- and y-translation of the entire sub-block is then adjusted accordingly.

This translation refinement operation is performed for each of the 16 32×32 sub-blocks in the watermark block, e.g., starting in the upper left corner, and working across and then down. The second sub-block can take, as its starting x/y translation, the refined values from the adjoining first sub-block. The third sub-block can start from the refined values generated for the adjoining second sub-block, and likewise the fourth sub-block can start from the refined translation values generated for the third sub-block.

The fifth sub-block is under the first sub-block, and can take its refined x/y translation values as a starting point. The sixth sub-block is under the second sub-block, and is adjacent to the fifth sub-block. In this case, the x/y translation of the second sub-block can be averaged with the x/y translation of the fifth sub-block to provide an initial x/y registration of the sixth sub-block. In like fashion, the refined x/y translation of an adjoining block, or two blocks, can serve as the starting point for iterating a refined translation for each successive sub-block.

Once each of the sub-blocks has been refined in x/y translation, a figure of merit is computed for each sub-block. This follows the basic procedure detailed above for the reference signal strength figure of merit.

In the oct-axis domain, the figure of merit for a sub-block can be computed by simply averaging (or summing) the oct-axis values for the 32 darkest locations in the sub-block after translation refinement. Ideally, each should have a value of −8. The figure of merit can be the ratio of the actual average to the ideal average, yielding a metric having a value between 0 and 1.

In a variant embodiment, variant oct-axis values are computed, employing a distance of 2. That is, instead of performing comparisons between a central element and the 8 immediately-surrounding elements in the watermark block, comparisons are performed on 8 elements that are one-element further removed. Again, the resulting oct-axis values are averaged, and ratioed to the ideal value of −8.

An ordered array is then compiled by weighting the oct-axis value for each of, e.g., the 4096 dark locations in the stored reference table (e.g., Table I), by the figure of merit of that location's sub-block. The array will thus start with a series of values near −8, e.g.

−8
−7.996
−7.992
−8
−8
. . .

After the first "knee," only about half of the ranked locations will actually be marked with a dark dot. Those locations will generate weighted values close to −8. However, the unmarked locations will generate seemingly random data, albeit skewed away from −8 (which would indicate dark dots at such locations), e.g.

−8 (dark location)
4.672 (light location)
−7.988 (dark location)
−2.426 (light location)
1.244 (light location)
−7.996 (dark location)
6.913 (light location)
. . .

After the second "knee," none of the ranked locations should be marked. The weighted values will thus all be pseudo-random—again skewed away from −8.

Figure 12:
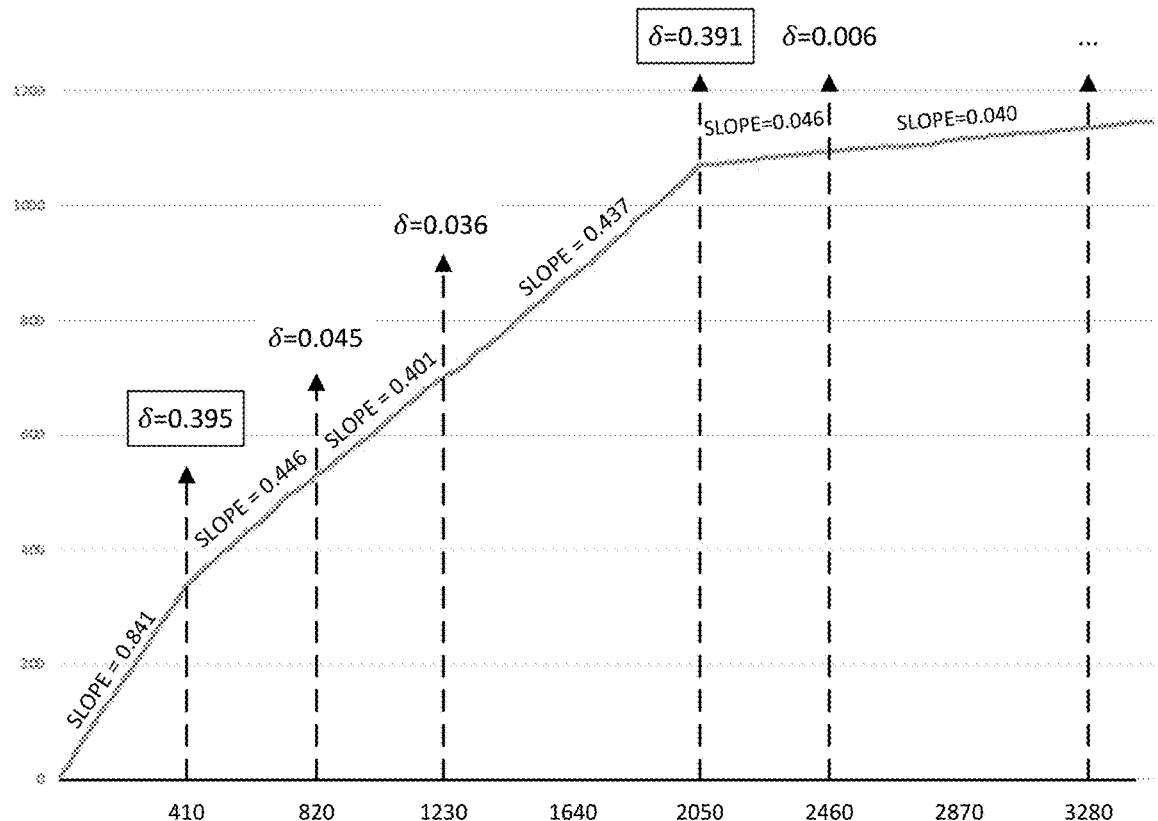
FIG. 12 plots another array of accumulated-dot-contribution data, indicating a first derivative approach to determining a protocol used by a particular optical code.

Note that in the described oct-axis implementation, the accumulated-dot-contribution goes increasingly-negative for Fixed Locations, unlike the curves shown in FIGS. 10 and 12, which go increasingly-positive.

As earlier-described, each of the Variable Locations in the ordered array expresses the value of a chip, e.g., −1 or +1. In the oct-axis domain, the dark marks representing the former are typically close to −8 in value (weighted by the confidence metric of a corresponding sub-block), while the light elements representing the latter are typically close to +8 in value. The values from the array can be divided by 8 to yield chips in the range of −1 to +1. Where available, these values are used to reconstitute elements of the 16-element sequence of chips for each signature bit, and are descrambled and combined (if more than one) to yield an extracted signature string. This string is provided to the decoder to obtain the corresponding watermark payload.

CONCLUDING REMARKS

It will be understood, from the foregoing description, that embodiments incorporating certain aspects of the present technology enable an optical code reader to quickly classify a code depicted in input imagery, so that appropriate decoding actions can be invoked. This classification may identify, e.g., (a) whether the code is a continuous tone or sparse watermark, (b) which of different reference signals it includes, and (c) which of different protocols are used in expressing reference and payload signal components of the code. A great variety of other features and technologies are detailed as well.

Having described and illustrated features of the technology with reference to illustrative arrangements, it should be apparent that the technology is not so limited.

For example, while techniques were described for discerning whether an input image depicted a V3 watermark or another type of watermark, e.g., by reference to the peaks in their respective reference signals, it will be recognized that such methods similarly can be employed to distinguish other types of marks from each other—such as a mark used in plastic textures versus a mark printed on paper labels Although the seven protocols detailed above have Fixed-to-Variable ratios between 1:2 and 1:8, ratios outside this range are also possible, and may be desirable in certain circumstances.

Likewise, while the detailed protocols yield print density values between 5% and 15%, values outside this range are readily achievable, and again may be desirable in certain circumstances.

It is not necessary that the indicia comprise dark marks on a light background. Light marks on a lighter background can be employed, e.g., using Pantone 9520 or 9500 colored ink on a white background, as taught in patent document 20180047127. Or an inverted mark can be formed, with light markings (of ink or otherwise) on a dark background. In the latter case, the ordered list of extrema could be light extrema of the reference signal—rather than dark extrema. However, applicant prefers to use a list of dark extrema, handling the case of an inverted mark by invoking the phase deviation process (as described in cited U.S. Pat. No. 9,959,587) for the normal case and, if unsuccessful, then a second time for the inverted case.

A sparse code can be applied by a monochrome printing technology, such as thermal or ink jet. Alternatively, it can be applied by the same printing technology employed for CMYK or spot color printing of package artwork, such as offset or flexo printing—in some instances being applied by a printing plate that prints other elements of the (non-signal bearing) artwork.

Still further, a sparse code can comprise a clear varnish or other surface treatment that is applied to locally change the reflectivity of a surface, e.g., between shiny and matte. Similarly, a code can be formed in a 3D fashion, such as by locally-raised or depressed features (e.g., as on plastic bottles and other containers). Laser engraving, ablating, and 3D printing are some of the other technologies that may be employed. (Laser engraving is particularly suitable for metal and plastic surfaces—such as drink cans, trays and clamshell containers.)

While it is desirable to mark locations corresponding to extrema of the reference signal, it is not essential that these extrema be numerically-ordered, as in the illustrated examples. As long as the encoder and the decoder use a common ordering of locations, any order can be employed. In one such embodiment, the 3690 darkest coordinate locations within the 16,384 locations of a 128×128 watermark block are each assigned a random position in an ordered list of 3690 entries, and this list is provided as a fixed data array both to encoders and decoders. When encoding with Protocol 5, the encoder marks the locations identified by entries 1-820 in this array, to signify the reference signal. It then marks the locations identified by entries 821-2461 with a mark, or not, in accordance with chip values corresponding to those block locations. The decoder sleuths the values of NFL and NVL, and uses data sensed from locations NFL+1 through (NFL+NVL), as indicated in the shared, ordered list, to extract the indicia payload.

Similarly, in distinguishing between different watermark types, or protocols, it is not necessary that all candidate types/protocols use the same reference signal, or that components of one be a subset of another. In some implementations, a first candidate can include reference signal components not included in a second candidate, and the second candidate can include components not included in the first candidate, etc.

In some embodiments, the extrema locations as ordered in the Table I list don't encompass all of the darkest locations. To avoid marks being clumped-together in the output indicia, a keep-out rule may be employed to exclude a location from the list if it would be next to a darker location already on the list (or next to two darker locations that already adjoin, etc.).

A primary use of the technology is in point of sale systems used at retail stores, e.g., reading 2D indicia on grocery products. However, such technology can be used in many other contexts. An example is in systems that sort plastic for recycling, e.g., as detailed in published application 20190306385 and pending application 63/000,471, filed Mar. 26, 2020. Such equipment may encounter one watermark protocol on a label of a plastic bottle, a second watermark protocol textured onto the surface of the plastic bottle, and a third watermark protocol formed on plastic returnable transport items (e.g., bulk carriers used for industrial purposes).

Although the detailed implementations employ signal blocks that are square in shape, organized as orthogonal rows and columns of waxels, it should be recognized that this is not essential. For example, a signal block can be comprised of elements arrayed in hexagonal cells and other lattices, etc.

While the illustrated embodiments employ reference signals comprised of sinusoids of different spatial frequencies and phases, the reference signal can alternatively or additionally comprise other orthogonal patterns. These can be varied in amplitude to obtain patterns of different appearances.

The specification makes reference to "image data," "imagery," and so on. It should be understood that such terms refer not just to pixel data and the like, but also derivatives thereof. One example is a counterpart set of data produced by filtering (e.g., oct-axis filtering) of input pixel data.

Naturally, acts included in one of the detailed algorithms can be employed in other algorithms as well. For example, details of decoding are provided in connection with Algorithm C, and likewise can be used with the other detailed algorithms.

It will be recognized that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The processes and system components detailed in this specification can be implemented as instructions for computing devices, including general purpose processor instructions for a variety of programmable processors, such as microprocessors and systems on a chip (e.g., the Intel Atom, the ARM A8 and Cortex series, the Qualcomm Snapdragon, and the nVidia Tegra 4. Implementation can also employ a variety of specialized processors, such as graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC).

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

This specification has discussed several different embodiments. It should be understood that the methods, elements and concepts detailed in connection with one embodiment can be combined with the methods, elements and concepts detailed in connection with other embodiments. While some such arrangements have been particularly described, some have not—due to the number of permutations and combinations. Applicant similarly recognizes and intends that the methods, elements and concepts of this specification can be combined, substituted and interchanged—not just among and between themselves, but also with those known from the cited references. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc. To give but a single example, in the embodiments described as combining the payload and reference signals in a weighted arrangement other than 1:1, a weighting of 1:1 can alternatively be used.

Although disclosed as complete systems, sub-combinations of the detailed arrangements are also separately contemplated (e.g., omitting various of the features of a complete system). While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The methods, processes, and systems described above may be implemented in hardware, software or a combination of hardware and software. For example, the signal processing operations for generating and reading optical codes are implemented as instructions stored in a memory and executed in a programmable computer (including both software and firmware instructions). Alternatively the operations are implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device).

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

The invention claimed is:

1. A method of decoding a payload from imagery depicting a sparse indicia, the sparse indicia comprising a 2D array of locations, some of which are marked and some of which are unmarked, wherein a first set of F locations are marked to indicate locations of reference signal extrema, and a second, different set of V locations are marked, or not, based on whether corresponding elements of a binary signature data string have first or second values, the method comprising the acts:
 identifying an ordered set of locations {L1, L2, L3, L4, L5, L6, L7, L8 . . . } in the depicted indicia, said set including said first set of F locations grouped together and said second set of V locations grouped together;
 for each location LP in said ordered set of locations, determining an accumulated-dot-contribution value KLP of the locations in the range of locations L1, L2, . . . LP, wherein each location in said set of ordered locations has a cumulative value associated therewith, thereby yielding a data series KL1, KL2, KL3 . . . ; and
 identifying, from said data series, which locations in said set of ordered locations form said set of F locations, by discerning a knee point in said series;
 wherein, in decoding the payload from the depicted sparse indicia, a decoder can ignore markings at said identified locations, since they are recognized as indicating locations of reference signal extrema rather than corresponding to elements of the binary signature data string, thereby improving decoding accuracy.

2. The method of claim 1 in which the act of identifying the ordered set of locations comprises sorting locations by associated reference signal value.

3. The method of claim 1 that further includes identifying, from said data series, which locations in said set of ordered locations form said set of V locations, by discerning a second knee point in said series.

4. The method of claim 1 in which the identifying act further includes determining a series of slopes from said data series, and identifying two consecutive slopes in said series with a greatest difference therebetween.

5. The method of claim 1 in which the identifying act further includes determining a set of second derivative values from said data series, and identifying a minimum in said set of second derivative values.

6. A system for decoding a payload from imagery depicting a sparse indicia, the sparse indicia comprising a 2D array of locations, some of which are marked and some of which are unmarked, wherein a first set of F locations are marked to indicate locations of reference signal extrema, and a second, different set of V locations are marked, or not, based on whether corresponding elements of a binary signature data string have first or second values, the system including a processor and a memory, the memory containing instructions that configure the processor to perform acts including:
 identifying an ordered set of locations {L1, L2, L3, L4, L5, L6, L7, L8 . . . } in the depicted indicia, said set including said first set of F locations grouped together and said second set of V locations grouped together;
 for each location LP in said ordered set of locations, determining an accumulated-dot-contribution value KLP of the locations in the range of locations L1, L2, . . . LP, wherein each location in said set of ordered locations has a cumulative value associated therewith, thereby yielding a data series KL1, KL2, KL3 . . . ; and
 identifying, from said data series, which locations in said set of ordered locations form said set of F locations, by discerning a knee point in said series;
 wherein markings at said identified F locations can be ignored, since they are recognized as indicating locations of reference signal extrema rather than corresponding to elements of the binary signature data string, thereby improving decoding accuracy.

7. The system of claim 6 in which said memory instructions configure the processor to identify the ordered set of locations by acts including sorting locations by associated reference signal value.

8. The system of claim 6 in which said memory instructions configure the processor to identify, from said data series, which locations in said set of ordered locations form said set of V locations, by discerning a second knee point in said series.

9. The system of claim 6 in which said memory instructions configure the processor to identify a series of slopes from said data series, and identify two consecutive slopes in said series with a greatest difference therebetween.

10. The system of claim 6 in which said memory instructions configure the processor to determine a set of second derivative values from said data series, and identify a minimum in said set of second derivative values.

11. A non-transitory computer readable medium containing instructions for configuring a processor to decode a payload from imagery depicting a sparse indicia, the sparse indicia comprising a 2D array of locations, some of which are marked and some of which are unmarked, wherein a first set of F locations are marked to indicate locations of reference signal extrema, and a second, different set of V locations are marked, or not, based on whether corresponding elements of a binary signature data string have first or second values, said instructions including instructions to perform acts including:

identifying an ordered set of locations {L1, L2, L3, L4, L5, L6, L7, L8 . . . } in the depicted indicia, said set including said first set of F locations grouped together and said second set of V locations grouped together;

for each location LP in said ordered set of locations, determining an accumulated-dot-contribution value KLP of the locations in the range of locations L1, L2, . . . LP, wherein each location in said set of ordered locations has a cumulative value associated therewith, thereby yielding a data series KL1, KL2, KL3 . . . ; and identifying, from said data series, which locations in said set of ordered locations form said set of F locations, by discerning a knee point in said series;

wherein markings at said identified F locations can be ignored, since they are recognized as indicating locations of reference signal extrema rather than corresponding to elements of the binary signature data string, thereby improving decoding accuracy.

12. The computer readable medium of claim 11 in which said instructions configure the processor to identify the ordered set of locations by acts including sorting locations by associated reference signal value.

13. The computer readable medium of claim 11 in which said computer readable medium instructions configure the processor to identify, from said data series, which locations in said set of ordered locations form said set of V locations, by discerning a second knee point in said series.

14. The computer readable medium of claim 11 in which said computer readable medium instructions configure the processor to identify a series of slopes from said data series, and identify two consecutive slopes in said series with a greatest difference therebetween.

15. The computer readable medium of claim 11 in which said instructions configure the processor to determine a set of second derivative values from said data series, and identify a minimum in said set of second derivative values.

\* \* \* \* \*